United States Patent
Luo et al.

(10) Patent No.: US 11,690,054 B2
(45) Date of Patent: Jun. 27, 2023

(54) GAP ENHANCEMENTS IN WIRELESS NETWORKS

(71) Applicant: QUALCOMM Incorporated, San Diego, CA (US)

(72) Inventors: Jianghong Luo, Skillman, NJ (US); Navid Abedini, Basking Ridge, NJ (US); Luca Blessent, Whitehouse Station, NJ (US); Karl Georg Hampel, Hoboken, NJ (US); Naeem Akl, Somerville, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/151,049

(22) Filed: Jan. 15, 2021

(65) Prior Publication Data
US 2021/0227544 A1  Jul. 22, 2021

Related U.S. Application Data

(60) Provisional application No. 62/964,489, filed on Jan. 22, 2020.

(51) Int. Cl.
*H04W 72/0453* (2023.01)
*H04L 27/26* (2006.01)

(52) U.S. Cl.
CPC ..... *H04W 72/0453* (2013.01); *H04L 27/2605* (2013.01)

(58) Field of Classification Search
CPC ........... H04W 72/0453; H04L 27/2605; H04L 5/0091; H04L 27/26025; H04L 27/2607; H04L 27/2646; H04L 27/2666; H04L 5/0048; H04L 5/0051; H04L 5/0032; H04L 5/003; H04L 5/001; H04B 7/022; H04B 7/0695

See application file for complete search history.

(56) References Cited

U.S. PATENT DOCUMENTS

2019/0109745 A1    4/2019  Abedini et al.
2021/0058926 A1*   2/2021  Li ..................... H04L 5/0091
2021/0120469 A1*   4/2021  Yuan ................... H04W 36/30
(Continued)

OTHER PUBLICATIONS

62933133,Specification,Nov. 8, 2019 (Year: 2019).*
(Continued)

*Primary Examiner* — Yu-Wen Chang
(74) *Attorney, Agent, or Firm* — Arun Swain; Loza & Loza LLP

(57) ABSTRACT

Aspects relate to enhancing the provision of gaps at transitions between resources allocated for communication on access links and resources allocated for communication on backhaul links. In some examples, a child integrated access backhaul network (IAB) node may transmit a message to a parent IAB node requesting a number of guard symbols to provide a gap at transitions. In some examples, the parent IAB node may transmit the number of guard symbols provided at transitions to the child IAB node. The parent IAB node, child IAB node, and/or an IAB donor node central unit may further identify a subcarrier spacing associated with the number of guard symbols.

17 Claims, 24 Drawing Sheets

(56) References Cited

U.S. PATENT DOCUMENTS

| | | | |
|---|---|---|---|
| 2021/0144705 A1* | 5/2021 | Li | H04W 28/0215 |
| 2021/0168748 A1* | 6/2021 | Miao | H04L 27/26025 |
| 2021/0218534 A1* | 7/2021 | Liu | H04L 5/0091 |
| 2021/0250884 A1* | 8/2021 | Iyer | H04W 56/0045 |
| 2021/0298000 A1* | 9/2021 | Park | H04L 5/0098 |
| 2022/0039038 A1* | 2/2022 | Liu | H04W 56/0005 |
| 2022/0061006 A1* | 2/2022 | Liu | H04W 72/0453 |
| 2022/0141074 A1* | 5/2022 | You | H04W 72/04 375/262 |
| 2022/0272699 A1* | 8/2022 | Zhuo | H04W 88/10 |

OTHER PUBLICATIONS

CMCC: "Discussion on Resource Multiplexing Among Backhaul and Access Links", 3GPP Draft, 3GPP TSG RAN WG1 #98bis, R1-1910162, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 1, 2019 (Oct. 1, 2019), XP051788969, 5 Pages, Retrieved from the Internet: URL: http://www.3gpp.org/ftp/tsg_ran/WG1_RL1/TSGR1_98b/Docs/R1-1910162.zip [retrieved on Oct. 1, 2019] paragraphs [02.1] [02.2].

Huawei, et al., "Resource Multiplexing Between Backhaul and Access IAB", 3GPP Draft, 3GPP TSG RAN WG1 Meeting #99, R1-1911856, 3rd Generation Partnership Project (3GPP), Mobile Competence Centre, 650, Route Des Lucioles, F-06921 Sophia-Antipolis Cedex, France, vol. RAN WG1, No. Reno, USA Nov. 18, 2019-Nov. 22, 2019, Nov. 9, 2019 (Nov. 9, 2019), XP051823038, 7 Pages, Retrieved from the Internet: URL: https:/fftp.3gpp.org/tsg_ran/WG1_RL1/TSGR1_99/Docs/R1-1911856.zip. R1-1911856.docx [retrieved on Nov. 9, 2019] paragraphs [02.1], [2.2.], [02.3].

International Search Report and Written Opinion—PCT/US2021/013770—ISA/EPO—dated Apr. 1, 2021.

WI Rapporteur (Qualcomm Incorporated) "Upper Layers Parameters to Support IAB Physical Layer Operation", 3GPP Draft, 3GPP TSG RAN WG1 Meeting #98bis, R1-1911724—Upper Layers Parameters to Support IAB Physical Layer Operation, 3rd Generation Partnership Project (3GPP), Mobile Competence Centre, 650, Route Des Ludoles, F-06921 Sophia, vol. RAN WG1, No. Chongqing, China, Oct. 14, 2019-Oct. 20, 2019, Oct. 30, 2019 (Oct. 30, 2019), XP051812936, 11 Pages, Retrieved from the Internet: URL: https://ftp.3gpp.org/tsg_ran/WG1_RL1/TSGR1_98b/Docs/R1-1911724.zip. R1-1911724. Upper Layers Parameters to Support IAB Physical Layer Operation.docx [retrieved on Oct. 30, 2019] p. 5-p. 8, p. 6.

* cited by examiner

GAP ENHANCEMENTS IN WIRELESS NETWORKS

CROSS-REFERENCE TO RELATED APPLICATIONS

The present Application for Patent claims priority to and the benefit of U.S. Provisional Patent Application No. 62/964,489, titled "GAP ENHANCEMENTS IN WIRELESS NETWORKS" filed Jan. 22, 2020, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to techniques for adjusting gaps between uplink and downlink transmissions in wireless networks, such as integrated access backhaul (IAB) networks.

INTRODUCTION

In 5G New Radio wireless communication networks, resources may be shared between access networks and backhaul networks. For example, the wireless spectrum may be used for both access links (e.g., links between base stations and user equipment (UEs)) and backhaul links (e.g., links between base stations and the core network). In such integrated access backhaul (IAB) networks, the shared wireless carrier may be time-divided into a plurality of frames, subframes, and slots. In some IAB network configurations, one or more slots may be allocated for access communication, while other slots may be allocated for backhaul communication.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a first integrated access backhaul (IAB) node within an IAB network is disclosed. The method includes communicating with a second IAB node over a first link and with a set of one or more child nodes over respective second links and transmitting a guard symbols desired message requesting the second IAB node provide a number of guard symbols at a transition between a first set of resources allocated for communication between the first IAB node and the second IAB node over the first link and a second set of resources allocated for communication between the first IAB node and the set of one or more child nodes over the respective second links. The method further includes identifying a subcarrier spacing associated with the number of guard symbols.

Another example provides a method of wireless communication at a first integrated access backhaul (IAB) node within an IAB network. The method includes communicating with a second IAB node over a first link and with a set of one or more child nodes over respective second links and receiving a guard symbols provided message from the second IAB node indicating a number of guard symbols provided by the second IAB node at a transition between a first set of resources allocated for communication between the first IAB node and the second IAB node over the first link and a second set of resources allocated for communication between the first IAB node and the set of one or more child nodes over the respective second links. The method further includes identifying a subcarrier spacing associated with the number of guard symbols.

Another example provides a method of wireless communication at a first integrated access backhaul (IAB) node within an IAB network. The method includes communicating with a second IAB node over a first link and receiving a guard symbols desired message from the second IAB node requesting the first IAB node provide a number of guard symbols at a transition between a first set of resources allocated for communication between the first IAB node and the second IAB node over the first link and a second set of resources allocated for communication between the second IAB node and a set of one or more child nodes of the second IAB node over the respective second links. The method further includes identifying a subcarrier spacing associated with the number of guard symbols.

Another example provides a method of wireless communication at a first integrated access backhaul (IAB) node within an IAB network. The method includes communicating with a second IAB node over a first link and transmitting a guard symbols provided message to the second IAB node indicating a number of guard symbols provided by the first IAB node at a transition between a first set of resources allocated for communication between the first IAB node and the second IAB node over the first link and a second set of resources allocated for communication between the second IAB node and a set of one or more child nodes of the second IAB node over respective second links. The method further includes identifying a subcarrier spacing associated with the number of guard symbols.

These and other aspects of the disclosure will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

DETAILED DESCRIPTION

Figure 1:
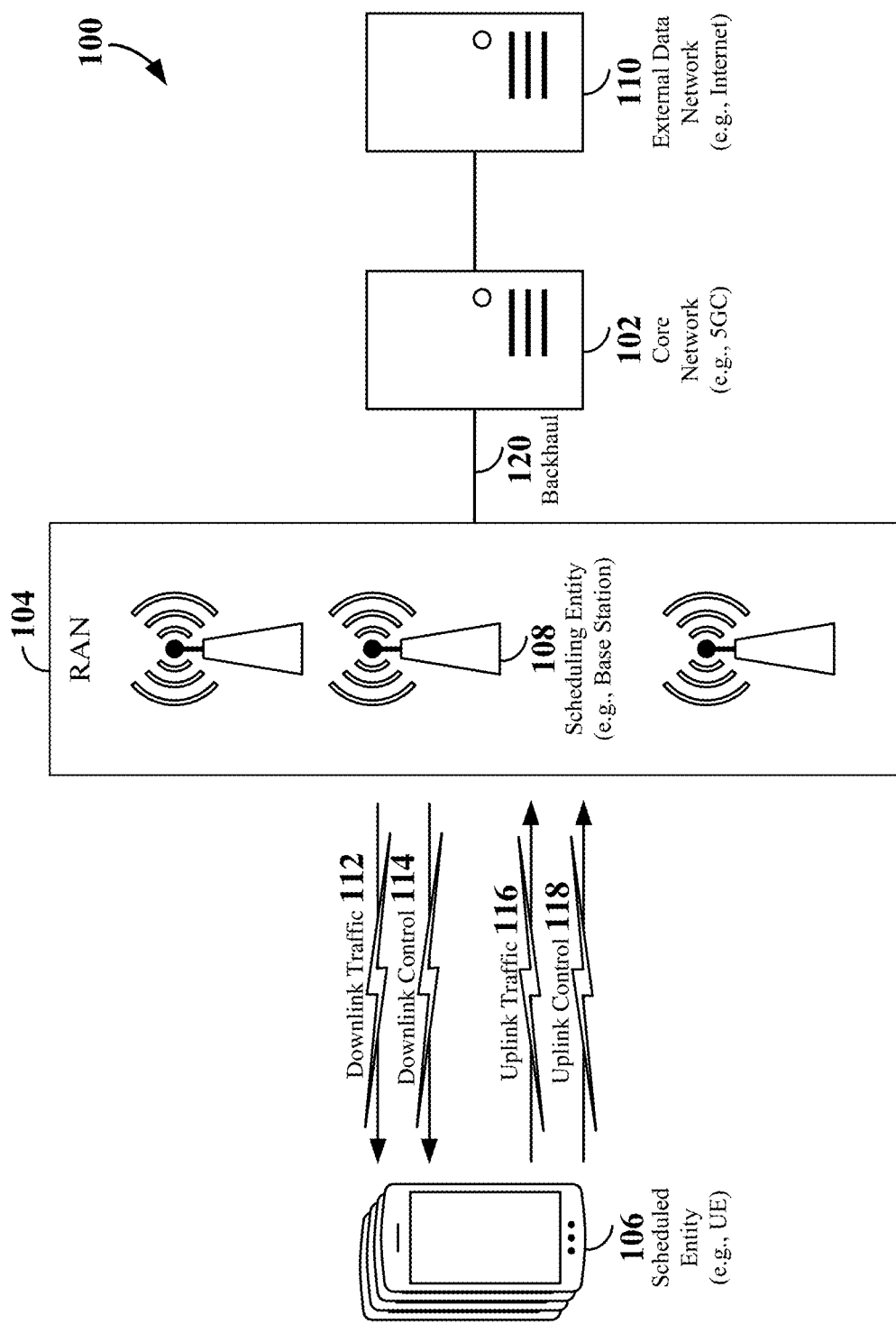
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure relate to enhancing the provision of gaps at transitions between resources allocated for communication on access links and resources allocated for communication on backhaul links in an integrated access backhaul (JAB) network. More generally, gaps may be provisioned at transitions between resources allocated for communication between a parent IAB node and a child IAB node on a first link (e.g., a backhaul link) and resources allocated for communication between the child IAB node and child nodes (e.g., other IAB nodes or UEs) of the child IAB node on respective second links.

In some examples, a child IAB node may periodically or in response to an event trigger generation of a guard symbols desired message to a parent IAB node requesting a number of guard symbols to provide a gap at transitions. For example, the child IAB node may trigger the generation of the guard symbols desired message upon integration of the child IAB node into the IAB network. As another example, the child IAB node may trigger the generation of the guard symbols desired message based on the round trip time (RTT) and/or pathloss of the backhaul link between the child IAB node and the parent IAB node.

In some examples, the child IAB node may request a respective number of guard symbols for both inter-slot transitions and intra-slot transitions. In some examples, the number of intra-slot guard symbols may be the same as the number of inter-slot guard symbols. In this example, the child IAB node may transmit a guard symbols desired message requesting a number of guard symbols applicable to both intra-slot and inter-slot transitions. In some examples, the number of guard symbols may differ between inter-slot transitions and intra-slot transitions. For example, the child IAB node may generate and transmit respective guard symbols desired messages for inter-slot transitions and intra-slot transitions, where the guard symbols desired messages may request different numbers of guard symbols for the intra-slot transitions and inter-slot transitions. In addition, the parent IAB node may generate and transmit respective guard symbols provided messages for inter-slot transitions and intra-slot transitions, where the guard symbols provided messages indicate different numbers of guard symbols provided by the parent IAB node at inter-slot transitions and intra-slot transitions.

In examples in which a different subcarrier spacing (SCS) is utilized on the first (parent) link and the second (child) links, the parent IAB node and child IAB node may use a reference SCS to identify whether a transition is an inter-slot transition or an intra-slot transition. In some examples, the reference SCS may be a first SCS utilized on the first link and associated with the guard symbols provided messages (for inter-slot and intra-slot transitions) sent by the parent IAB node. In other examples, the child IAB node may transmit a second SCS utilized on the second links to the parent IAB node with the guard symbols desired messages. In this example, the reference SCS may be one of the maximum SCS between the first and second SCS, a minimum between the first and second SCS, the first SCS, or the second SCS.

In some examples, the SCS associated with the guard symbols may be a default SCS preconfigured on the child and parent IAB nodes or may be signaled to the child and parent IAB nodes via a medium access control-control element (MAC-CE) or via both a radio resource control (RRC) message sent from an IAB donor node central unit to the child IAB node and an F1-Application Protocol (F1-AP) message sent from the IAB donor node central unit to the parent IAB node. For example, a MAC-CE transmitted from the child IAB node to the parent IAB node may include the guard symbols desired message and the requested SCS to be utilized for the guard symbols. In another example, a MAC-CE transmitted from the parent IAB node to the child IAB node may include the guard symbols provided message and the SCS associated with the provided guard symbols. In some examples, the default SCS includes the backhaul SCS of an active bandwidth part within which the parent IAB node and child IAB nodes are communicating over the first (parent) link.

In some examples, the number of guard symbols may include a respective number of guard symbols for each of a plurality of switch types. Each switch type may include a respective switch between the child IAB node transmitting or receiving on the first (parent) link and the child IAB node transmitting or receiving on the respective second (child) links. In some examples, the SCS may apply to each of the switch types. In other examples, each switch type may be associated with a respective SCS.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
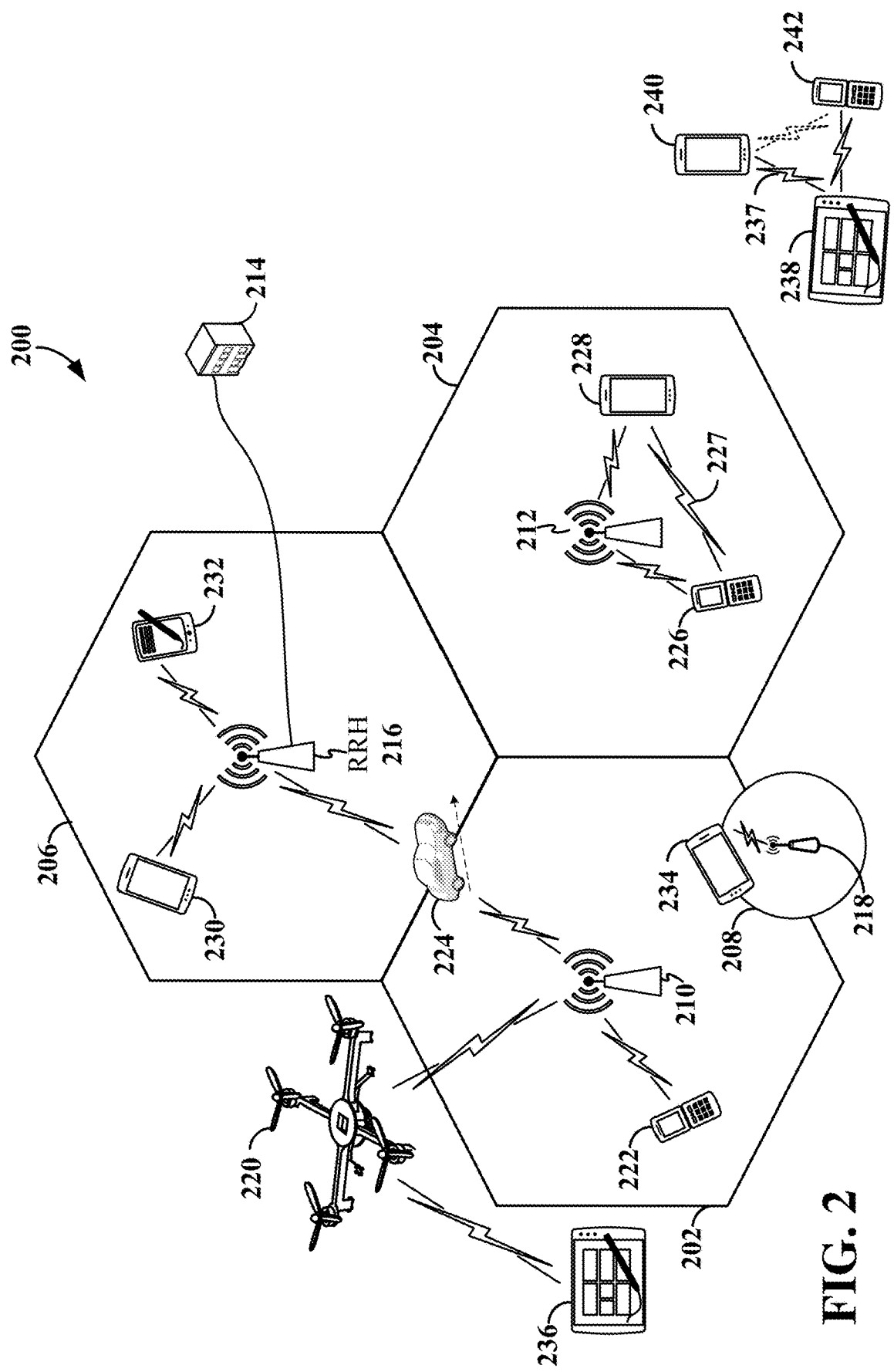
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or a transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that information through the base station 212. In this example, the base station 212 may allocate resources to the UEs 226 and 228 for the sidelink communication. In some examples, the sidelink signals 227 and 237 include sidelink traffic (e.g., a physical sidelink shared channel) and sidelink control (e.g., a physical sidelink control channel). In either example, such sidelink signaling 227 and 237 may be implemented in a device-to-device (D2D) network, P2P network, vehicle-to-vehicle (V2V) network, a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
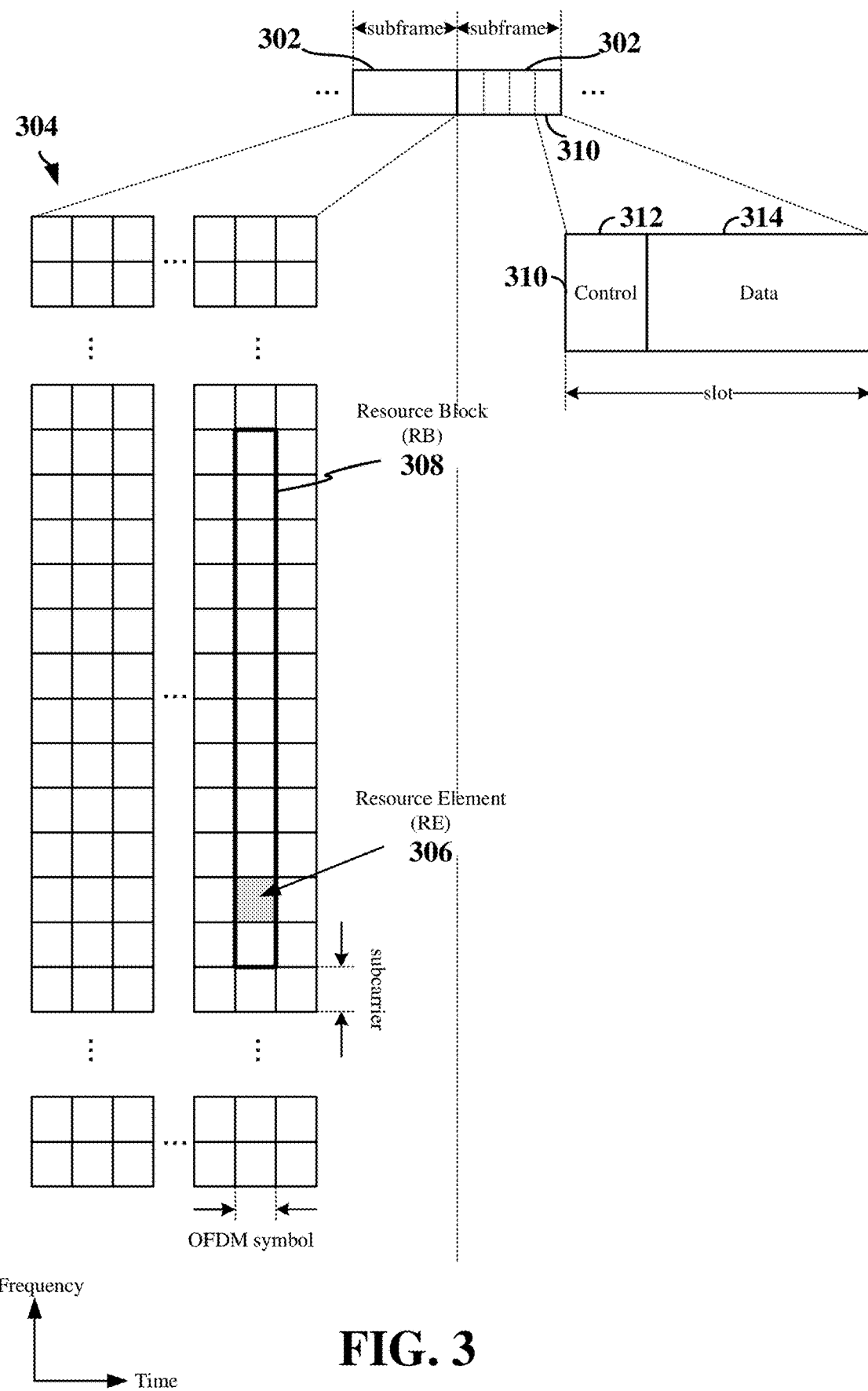
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
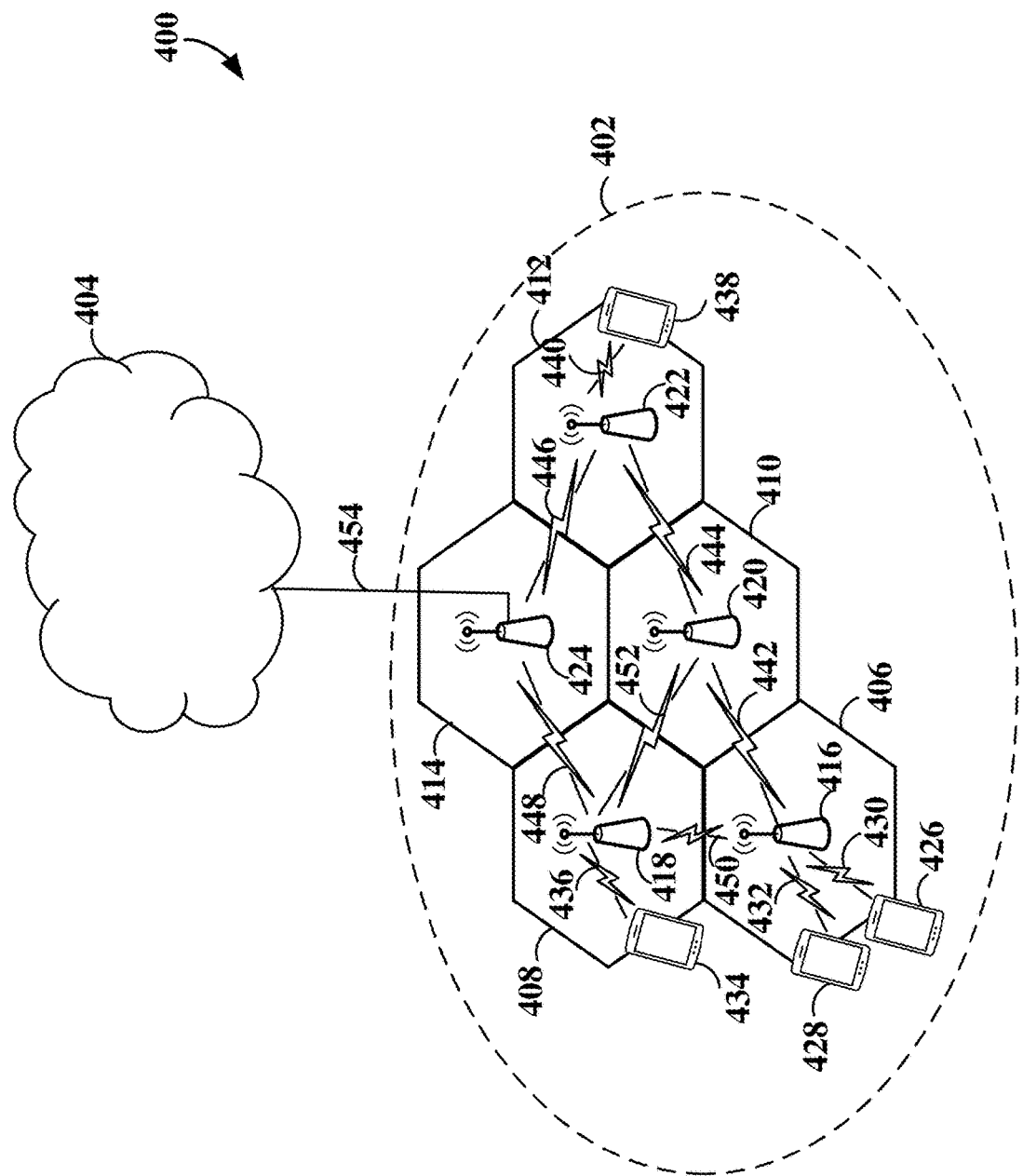
FIG. 4 is a diagram providing a high-level illustration of one example of a network configuration including an integrated access backhaul (IAB) network according to some aspects.

FIG. 4 is a schematic diagram providing a high-level illustration of one example of an integrated access backhaul (IAB) network configuration 400 that may be utilized in some aspects of the disclosure. In this illustration, a communication network 402, such as an IAB network, is coupled to a remote network 404, such as a main backhaul network or mobile core network. In such an IAB network 402, the wireless spectrum may be used for both access links and backhaul links. In some examples, the wireless spectrum may utilize millimeter-wave (mmWave) or sub-6 GHz carrier frequencies.

The IAB network 402 may be similar to the radio access network 200 shown in FIG. 2, in that the IAB network 402 may be divided into a number cells 406, 408, 410, 412, and 414, each of which may be served by a respective IAB node 416, 418, 420, 422, and 424. Each of the IAB nodes 416-424 may be an access point, base station (BS), eNB, gNB, or other node that utilizes wireless spectrum (e.g., the radio frequency (RF) spectrum) to support access for one or more UEs located within the cells 406-414 served by the IAB nodes.

In the example shown in FIG. 4, IAB node 416 communicates with UEs 426 and 428 via wireless access links 430 and 432, IAB node 418 communicates with UE 434 via wireless access link 436, and IAB node 422 communicates with UE 438 via wireless access link 440. The IAB nodes 416-424 are further interconnected via one or more wireless backhaul links 442, 444, 446, 448, 450, and 452. Each of the wireless backhaul links 442-452 may utilize the same wireless spectrum (e.g., the radio frequency (RF) spectrum) as the access links 430-440 to backhaul access traffic to/from the remote network 404. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 402.

In the example shown in FIG. 4, IAB node 416 communicates with IAB node 420 via wireless backhaul link 442, IAB node 420 communicates with IAB node 422 via wireless backhaul link 444, IAB node 422 communicates with IAB node 424 via wireless backhaul link 446, IAB node 424 communicates with IAB node 418 via wireless backhaul link 448, IAB node 418 communicates with IAB node 416 via wireless backhaul link 450, and IAB node 418 communicates with IAB node 420 via wireless backhaul link 452. As shown in FIG. 4, each IAB node 416-424 may be connected via respective wireless backhaul links 442-452 to two or more other IAB nodes for robustness.

Some or all of the IAB nodes 416-424 may also be connected via wired backhaul links (e.g., fiber, coaxial cable, Ethernet, copper wires, etc.) and/or microwave backhaul links. Thus, the IAB network 402 may support both wired/microwave and wireless backhaul traffic. At least one of the IAB nodes (e.g., IAB node 424) may be a border IAB node, also referred to herein as an IAB donor node, that also provides a communication link 454 to the remote network 404. For example, the IAB donor node 424 may include a wired (e.g., fiber, coaxial cable, Ethernet, copper wires), microwave, or other suitable link 454 to the remote network 404.

To facilitate wireless communication between the IAB nodes 416-424 and between the IAB nodes 416-424 and the UEs served by the IAB nodes 416-424, each IAB node 416-424 may be configured to operate as both a scheduling entity and a scheduled entity. Thus, an IAB node (e.g., IAB node 416) may utilize the same wireless spectrum to transmit access traffic to/from UEs and to then backhaul that access traffic to/from the remote network 404. For example, to backhaul access traffic to/from IAB node 418, IAB node 418 may communicate with IAB node 420 to transmit backhaul access traffic via wireless backhaul link 442, IAB node 420 may communicate with IAB node 422 to transmit the backhaul access traffic via wireless backhaul link 444, and IAB node 422 may communicate with IAB node 424 to transmit the backhaul access traffic via wireless backhaul link 446. In this example, IAB nodes 420 and 422 may each operate as both a scheduling entity and a scheduled entity to backhaul access traffic to/from IAB node 416. As such, communication between a pair of IAB nodes may be individually scheduled by one of the IAB nodes within the pair.

In other examples, an IAB node may schedule wireless backhaul communications between other pairs of IAB nodes. For example, IAB node 424 may operate as the scheduling entity for the IAB network 402, while IAB nodes 416, 420, and 422 each operate as a scheduled entity to backhaul access traffic to/from IAB node 416. In this example, IAB node 424 may schedule wireless backhaul communications between each of the pairs of IAB nodes (e.g., between IAB node 416 and IAB node 420, between IAB node 420 and IAB node 422, and between IAB node 422 and IAB node 424). As another example, IAB node 422 may operate as a scheduling entity to schedule wireless backhaul communications between IAB nodes 416 and 420 and also between IAB node 420 and IAB node 422. IAB node 422 may then operate as a scheduled entity to allow IAB node 424 to schedule wireless backhaul communications therebetween.

Figure 5:
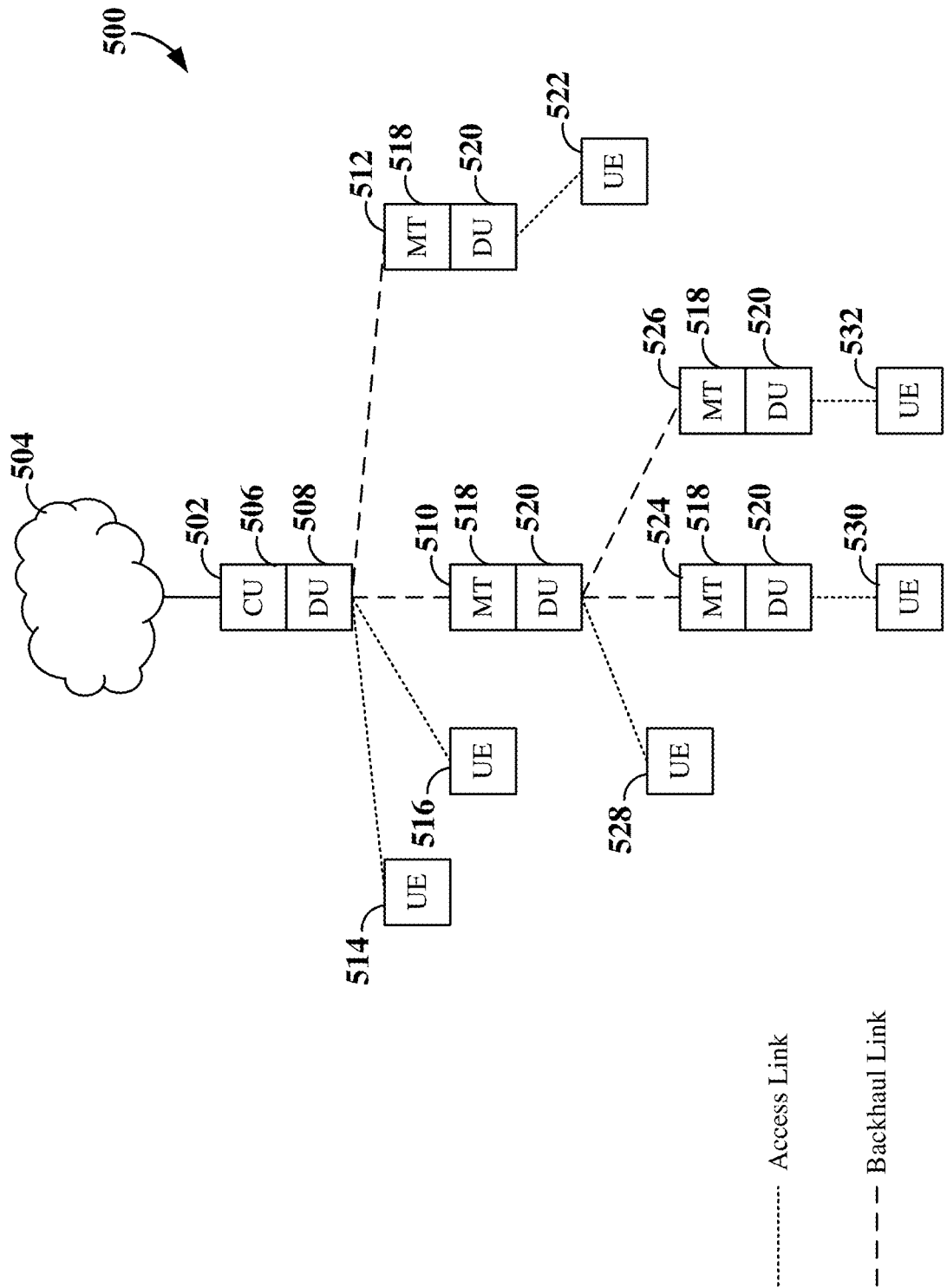
FIG. 5 is a diagram illustrating an example of IAB node functionality within an IAB network according to some aspects.

FIG. 5 is a schematic diagram illustrating an example of IAB node functionality within an IAB network 500. In the example shown in FIG. 5, an IAB node 502 is shown coupled to a core network 504 via a wireline connection. This IAB node 502 may be referred to herein as an IAB donor node, which may be, for example, an enhanced gNB including functionality for controlling the IAB network 500. In some examples, the IAB donor node 502 may include a central unit (CU) 506 and a distributed unit (DU) 508. The CU 506 is configured to operate as a centralized network node (or central entity) within the IAB network 500. For example, the CU 506 may include radio resource control (RRC) layer functionality and packet data convergence protocol (PDCP) layer functionality to control/configure the other nodes (e.g., IAB nodes and UEs) within the IAB network 500.

The DU 508 is configured to operate as a scheduling entity to schedule scheduled entities (e.g., other IAB nodes and UEs) of the IAB donor node 502. For example, the DU 508 of the IAB donor node 502 may operate as a scheduling entity to schedule IAB nodes 510 and 512 and UEs 514 and 516. Thus, the DU 508 of the IAB donor node 502 may schedule communication with IAB nodes 510 and 512 via respective backhaul links and schedule communication with UEs 514 and 516 via respective access links. In some examples, the DU 508 may include the radio link control (RLC), medium access control (MAC), and physical (PHY) layer functionality to enable operation as a scheduling entity.

Each of the IAB nodes 510 and 512 may be configured as a Layer 2 (L2) relay node including a respective DU 520 and a mobile termination (MT) unit 518 to enable each L2 relay IAB node 510 and 512 to operate as a scheduling entity and a scheduled entity. For example, the MT unit 518 within each of the L2 relay IAB nodes 510 and 512 is configured to operate as a scheduled entity that may be scheduled by the IAB donor node 502. Each MT unit 518 within the L2 relay IAB nodes 510 and 512 further facilitates communication with the IAB donor node 502 via respective backhaul links. In addition, the DU 520 within each of the L2 relay IAB nodes 510 and 512 operates similar to the DU 508 within the IAB donor node 502 to function as a scheduling entity to schedule one or more respective scheduled entities (e.g., other IAB nodes and/or UEs) of the L2 relay IAB nodes 510 and 512.

For example, the DU 520 of L2 relay IAB node 512 functions as a scheduling entity to schedule communication with a UE 522 via an access link, while the DU 520 of L2 relay IAB node 510 functions as a scheduling entity to schedule communication with the MT units 518 of L2 relay IAB nodes 524 and 526 via respective backhaul links and a UE 528 via an access link. Each of the L2 relay IAB nodes 524 and 526 further includes a respective DU 520 that functions as a scheduling entity to communicate with respective UEs 530 and 532. Thus, in the network topology illustrated in FIG. 5, since IAB donor node 502 is configured to control each of the other nodes in the IAB network, the IAB donor node 502 is a parent IAB node of child IAB nodes 510, 512, 524 and 526. In addition, IAB node 510 is further a parent IAB node of child IAB nodes 524 and 526. For example, the CU 506 and DU 508 within IAB donor node 502 may function as the parent IAB node of child IAB nodes 510, 512, 524, and 526 and the DU 520 within IAB node 510 may function as the parent IAB node of child IAB nodes 524 and 526. The MT unit 518 within IAB nodes 510, 512, 524, and 526 may further function as child IAB nodes.

In a mobile IAB network, one or more of the L2 relay IAB nodes 510, 512, 524, and/or 526 may be moving within the IAB network 500. For example, an L2 relay IAB node (e.g., IAB node 524) may be a mobile IAB node installed on a bus, train, taxi, platooned vehicle, or other moveable object. As a mobile child IAB node 524 moves through the IAB network 500, the propagation delay from the parent IAB node 510 to the child IAB node 524 dynamically changes. Thus, the downlink reception timing of downlink signals received at the child IAB node 524 changes. To ensure synchronization of downlink and uplink transmission timing between the parent IAB node 510 and child IAB node 524, the parent IAB node 510 may measure the round-trip time (RTT) of communication between the parent IAB node 510 and the child IAB node 524 and provide a timing advance (TA) command to the UE containing a TA value indicative of the RTT for use by the child IAB node 524 in adjusting the uplink transmission timing of signals to the parent IAB node 510.

Figure 6:
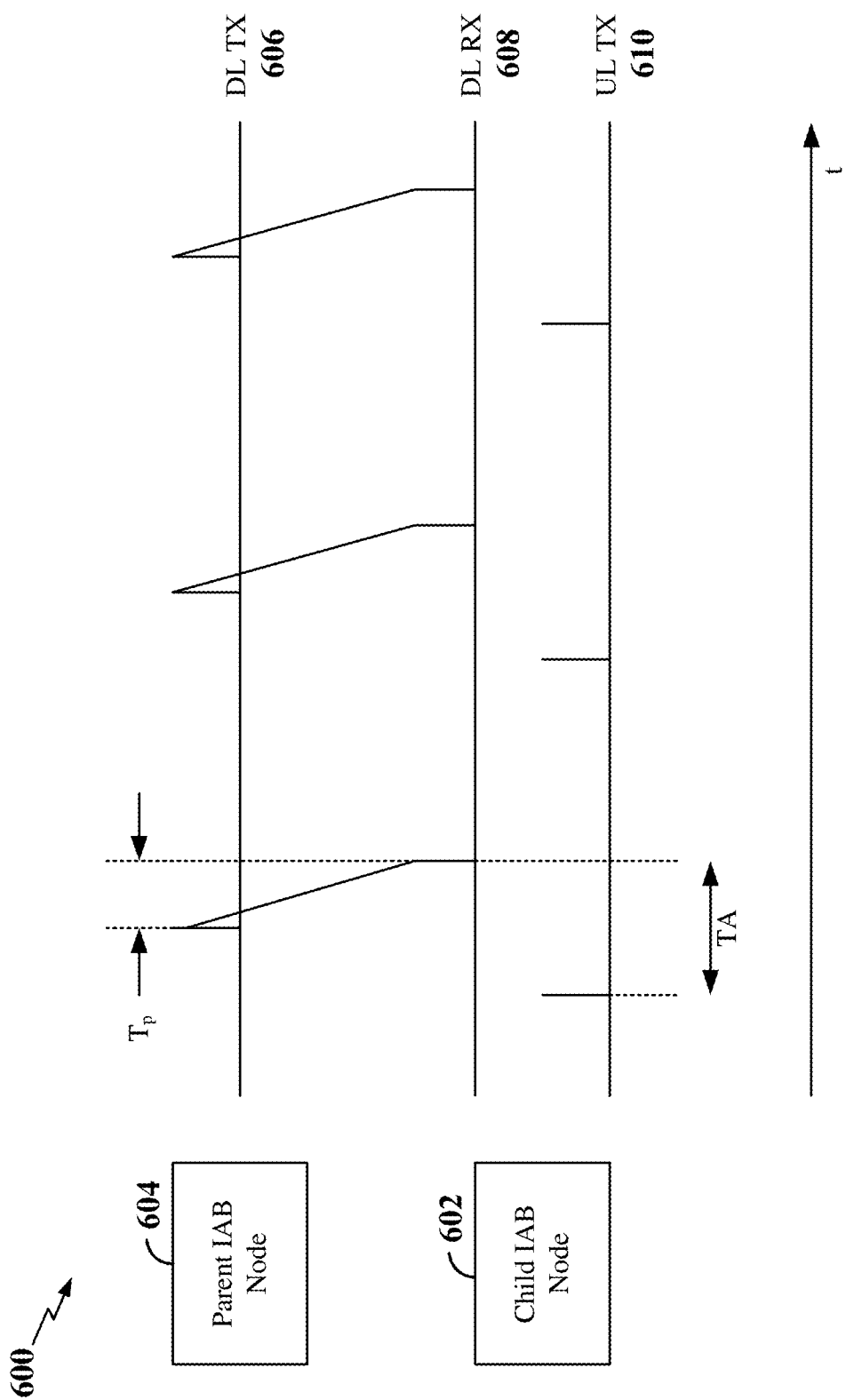
FIG. 6 is a diagram illustrating an example of time synchronization in an IAB network according to some aspects.

FIG. 6 illustrates an example of time synchronization in an IAB network 600. In the example shown in FIG. 6, a child IAB node 602 (e.g., an MT unit of an IAB node) is in wireless communication with a parent IAB node 604 (e.g., a DU of an IAB node) over a backhaul link. Each IAB node 602 and 604 may correspond, for example, to any of the IAB nodes illustrated in FIG. 4 or 5. The downlink reception timing (DL RX) 608 of the child IAB node 602 in relation to the downlink transmission timing (DL TX) 606 of the parent IAB node 604 over a period of time (t) is shown in FIG. 6. As can be seen in the example of FIG. 6, there is a propagation delay ($T_p$) between the DL TX 606 and DL RX 608. The propagation delay ($T_p$) is representative of the over-the-air transmission time of packets transmitted from the parent IAB node 604 to the child IAB node 602.

FIG. 6 further illustrates the uplink transmission timing (UL TX) 610 of uplink signals transmitted from the child IAB node 602 to the parent IAB node 604. The UL TX 610 of the child IAB node 602 may be adjusted based on a timing advance (TA) command including a TA value received from the parent IAB node 604. The TA value is indicative of a round-trip time (RTT) of communication between the parent IAB node 604 and the child IAB node 602. For example, the RTT may be equal to twice the propagation delay ($T_p$). In some examples, the parent node 604 may estimate the RTT based on uplink signals, such as random access signals, received from the child IAB node 602. For example, the child IAB node 602 may transmit a random access preamble message to the parent IAB node 604. From the random access preamble message, the parent IAB node 604 (or centralized network node, such as IAB donor node central unit) may estimate the RTT and convey the TA command to the child IAB node 602 within a random access response message.

The child IAB node 602 may adjust the UL TX 610 based on the DL RX 608 and the TA value. For example, the child IAB node 602 may set the UL TX 610 based on the difference between the DL RX 608 and the TA value. The child IAB node 602 may continually track the DL RX 608 and adjust the UL TX 610 based on the DL RX 608 and the current TA value.

Figure 7:
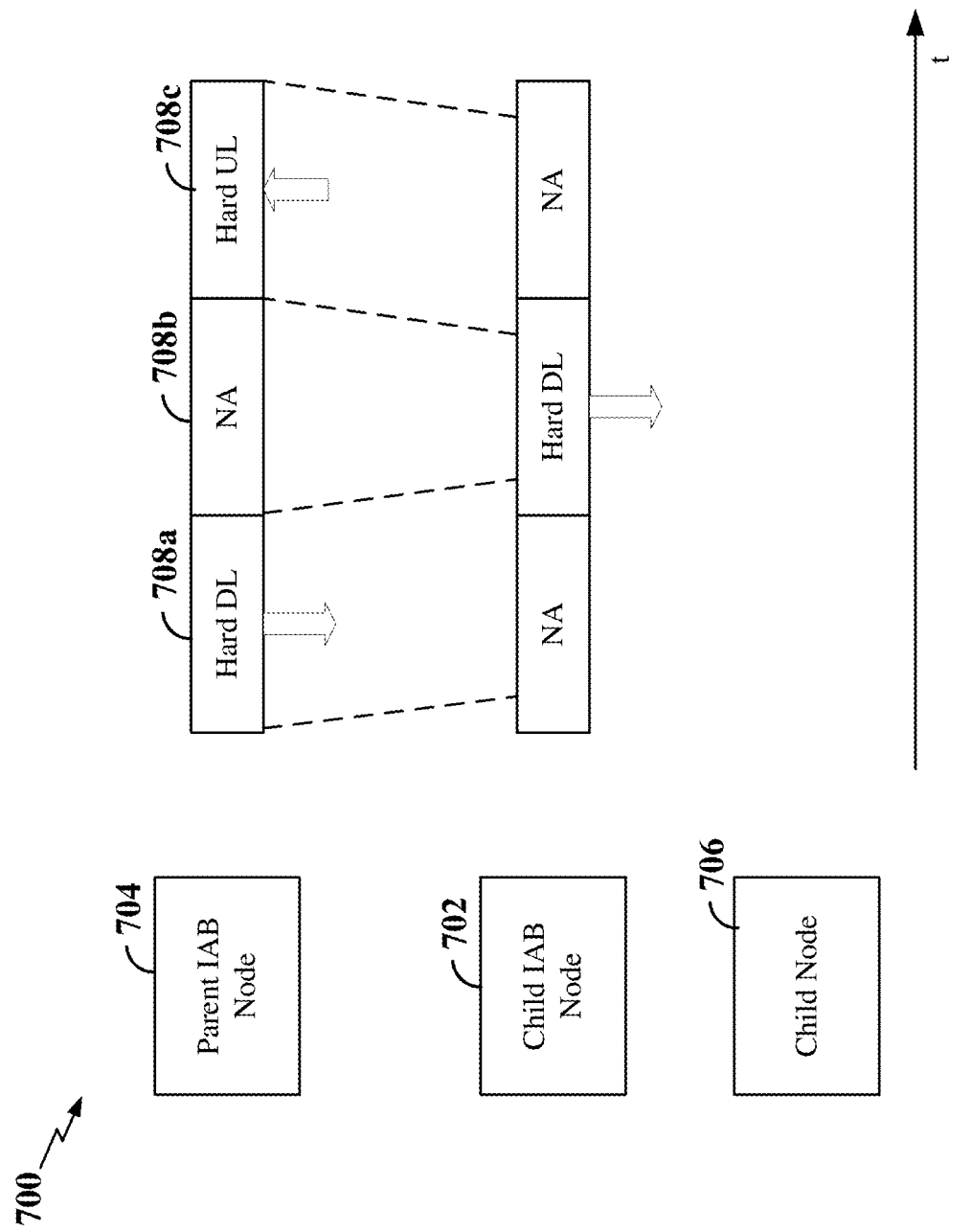
FIG. 7 is a diagram illustrating resource allocation in an IAB network according to some aspects.

FIG. 7 is a diagram illustrating resource allocation in an IAB network 700 according to some aspects. In the example shown in FIG. 7, a parent IAB node 704 is in wireless communication with a child IAB node 702 via a first (e.g., backhaul) link. The child IAB node 702 is further in wireless communication with a child node 706 (e.g., another IAB node or UE) via a second (e.g., backhaul or access) link. Each IAB node 702 and 704 may correspond, for example, to any of the IAB nodes illustrates in FIG. 4 or 5.

The IAB network 700 may coordinate the allocation of resources between parent IAB nodes 704 and child IAB nodes 702 in a time division multiplexed configuration. For example, the IAB network 700 may utilize a wireless carrier time-divided into a plurality of frames, subframes, and slots. Within a frame, subframe, or slot, for each IAB node DU, the IAB donor node CU (e.g., shown in FIG. 5) may allocate different types of resources in the time domain, such as hard downlink (DL) resources, hard uplink (UL) resources, soft DL resources, soft UL resources, or resources that are not available (NA). Hard DL and hard UL resources allocated to an IAB node DU are resources that the IAB node DU may utilize regardless of whether the IAB node includes a co-located MT unit. Soft DL and soft UL resources allocated to an IAB node DU are resources that the IAB node DU may share with a co-located MT unit. Not available (NA) resources are resources that the IAB node DU may not utilize except for cell-specific signals, such as the SSB, CSI-RS, physical random access channel (PRACH), and SR.

In the example shown in FIG. 7, resources are shown time-divided into three sets of resources 708a, 708b, and 708c. Each set of resources 708a, 708b, and 708c may correspond to a frame, subframe, slot, or portion of a frame, subframe, or slot. The first set of resources 708a is shown allocated to the parent IAB node DU 704 as a hard DL resource and to the child IAB node DU 702 as not available. The second set of resources 708b is shown allocated to the parent IAB node DU 704 as not available and to the child IAB node DU 702 as a hard DL resource. The third set of resources 708c is shown allocated to the parent IAB node DU 704 as a hard UL resource and to the child IAB node DU 702 as not available. Therefore, the parent IAB node DU 704 may use the first set of resources 708a to transmit downlink information (e.g., downlink control and/or data) to the MT unit of the child IAB node 702 via the first link. The second set of resources 708b may then be used by the child IAB node DU 702 to transmit downlink information (e.g., downlink control and/or data) to the child node 706 via the second link. The third set of resources 708c may then be used by the parent IAB node DU 704 to receive uplink information (e.g., uplink control and/or data) from the MT unit of the child IAB node 702 via the first link.

As shown in FIG. 7, the child IAB node 702 transitions from the MT unit to the DU between the first set of resources 708a and the second set of resources 708b and then again transitions from the DU back to the MT unit between the second set of resources 708b and the third set of resources 708c. Each transition may involve the child IAB node 702 performing a hardware switch between transmitting and receiving and/or modifying an analog beam width utilized for transmission or reception. In addition, downlink transmissions from the parent IAB node 704 within the first set of resources 708a may be received at the child IAB node 702 during the second set of resources 708b as a result of the propagation delay between the parent IAB node 704 and the child IAB node 702. Furthermore, the child IAB node 702 may initiate uplink transmissions associated with the third set of resources 708c to the parent IAB node 704 within the second set of resources 708b based on a TA value provided by the parent IAB node 704 to the child IAB node 702.

To facilitate switching at the child IAB node 702 (e.g., between transmitting and receiving and/or analog beam width) and to further avoid or minimize resource overlap between MT unit transmissions/receptions and DU transmissions/receptions due to a TA or propagation latency, a gap may be provided at the edge (e.g., beginning or end) of the resources where a transition between the MT unit of the child IAB node 702 and the DU of the child IAB node 702 occurs. For example, a first gap may be provided at the transition between the first set of resources 708a and the second set of resources 708b and a second gap may be provided between the second set of resources 708b and the third set of resources 708c. Each gap may include one or more guard symbols (e.g., OFDM or SC-FDMA symbols) within a set of resources that are not utilized for transmission or reception.

Figure 8:
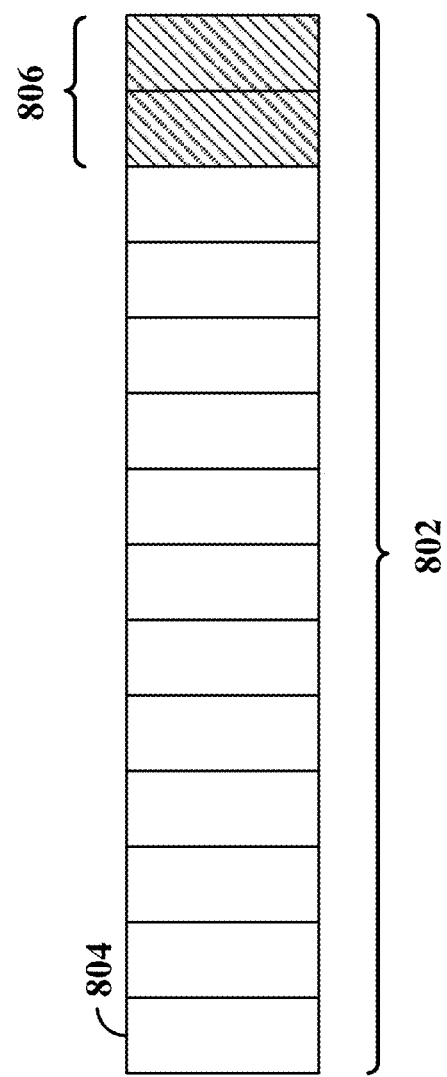
FIG. 8 is a diagram illustrating an example of a gap including a number of guard symbols provided at transitions in an IAB network according to some aspects.

FIG. 8 is a diagram illustrating an example of a gap including a number of guard symbols provided at transitions in an IAB network. In the example shown in FIG. 8, time is illustrated along the horizontal axis, while frequency is illustrated along the vertical axis. FIG. 8 illustrates a set of resources 802, including a number of symbols 804 in the time domain. The set of resources 802 may correspond, for example, to a slot including 14 symbols. In the example shown in FIG. 8, the gap 806 is provided at the end of the slot and includes the last two symbols 804 in the slot. It should be understood that the number of symbols within the gap 806 may include any suitable number, and in some examples, the number of symbols may be between 0 and 4 symbols.

Referring again to FIG. 7, in various aspects of the disclosure, based on the propagation delay, TA value, and switch time of the child IAB node 702, the child IAB node 702 may generate and transmit a guard symbols desired (GuardSymbolsDesired) message to the parent IAB node 704 requesting the parent IAB node 704 provide a number of guard symbols at transitions (e.g., the transition between the first set of resources 708a and the second set of resources 708b and between the second set of resources 708b and the third set of resources 708c). In response, the parent IAB node 704 may generate and transmit a guard symbols provided (GuardSymbolsProvided) message to the child IAB node 702 indicating a number of guard symbols provided by the parent IAB node 704 to the child IAB node 702 at transitions thereof (e.g., between the first set of resources 708a and the second set of resources 708b and between the second set of resources 708b and the third set of resources 708c).

In some examples, the number of guard symbols provided in the guard symbols provided message may be the same as the number of guard symbols requested in the guard symbols desired message. In other examples, the number of guard symbols provided may be less than the number of guard symbols requested. In this example, the child IAB node 702 may be configured to avoid or resolve any transition conflicts (e.g., switching or overlapping transmissions/receptions at the transition). For example, the child IAB node DU 702 may transmit on only a portion of the second set of resources 708b to avoid or resolve transition conflicts.

One or both of the guard symbols desired message and the guard symbols provided message may further indicate a subcarrier spacing (SCS) associated with the guard symbols. For example, the parent IAB node 704 and child IAB node 702 may utilize a first SCS for communication over the first link, while the child IAB node 702 and the child node 706 may utilize a second SCS for communication over the second link. In some examples, the child IAB node 702 may request the parent IAB node provide one or more guard symbols with the second SCS to align with the transmission timing on the second link (e.g., using the second set of resources 708b). The parent IAB node 704 may then provide one or more guard symbols with the second SCS of the second link or the parent IAB node 704 may provide one or more guard symbols with the first SCS of the first link in the guard symbols provided message.

In some examples, the guard symbols desired message and guard symbols provided message may include a single number of guard symbols (optionally with an associated SCS) for any switch type involved in a transition. In other examples, the guard symbols desired message and guard symbols provided message may include a respective number of guard symbols for each switch type. Here, the term switch type refers to a change between transmissions/receptions by the DU of an IAB node and transmissions/receptions by the MT unit of an IAB node.

Figure 9:
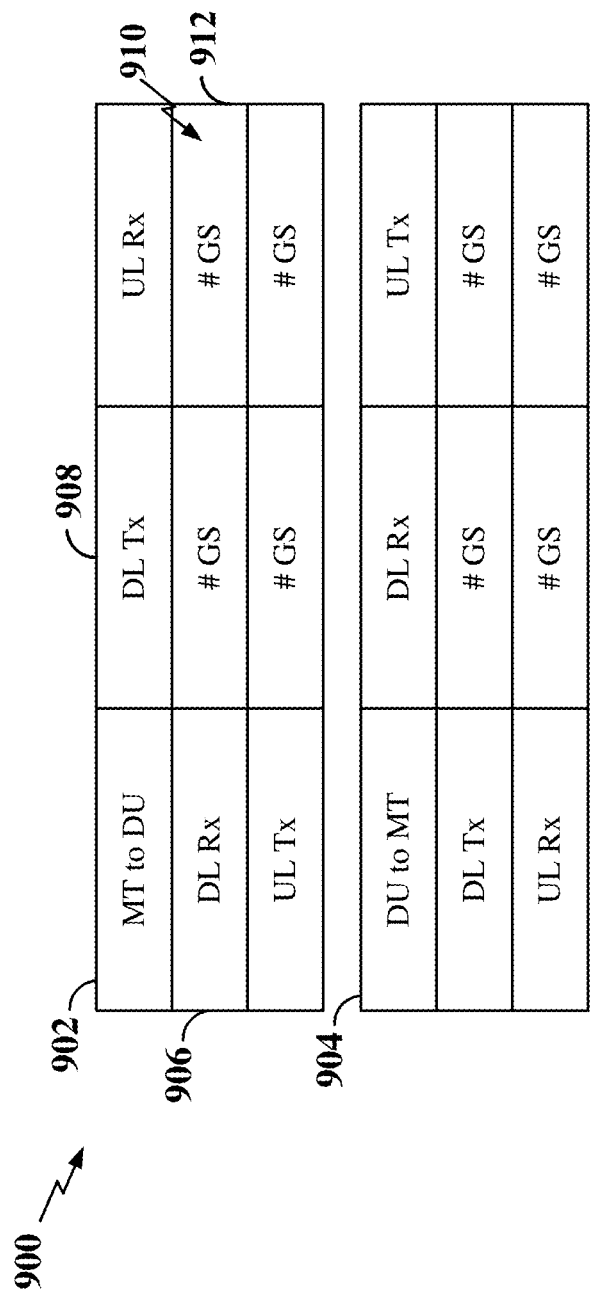
FIG. 9 illustrates an example of a table including different switch types and associated numbers of guard symbols in an IAB network according to some aspects.

FIG. 9 illustrates an example of a table 900 including different switch types 910 and associated numbers of guard symbols 912 in an IAB network. Each switch type 910 involves a switch from a MT unit to a DU of an IAB node (MT to DU switch) 902 or a switch from the DU to the MT unit of the IAB node (DU to MT switch 904). In addition, each switch type 910 involves a switch from one transmission/reception direction 906 to another transmission/reception direction 908. In the example shown in FIG. 9, there are eight switch types 910. For example, for an MT to DU switch 902, there are four switch types 910: DL reception by the MT unit to DL transmission by the DU; DL reception by the MT unit to UL reception by the DU; UL transmission by the MT unit to DL transmission by the DU; and UL transmission by the MT unit to UL reception by the DU. In addition, for a DU to MT switch 904, there are four switch types 910: DL transmission by the DU to DL reception by the MT unit; DL transmission by the DU to UL transmission by the MT unit; UL reception by the DU to DL reception by the MT unit; and UL reception by the DU to UL transmission by the DU.

Each switch type 910 may be associated with a respective number of guard symbols 912. In some examples, the number of guard symbols may be the same among each of the switch types 910. In other examples, one or more of the switch types 910 may include a different number of guard symbols. The table 900 containing the number of guard symbols 912 for each switch type 910 may be stored, for example, in the parent IAB node and child IAB node to provide gaps at transitions between operation of the child IAB node DU and operation of the MT unit of the child IAB node.

Various aspects of the disclosure relate to enhancing the provisioning of gaps at transitions between resources allocated for communication between a parent IAB node and a child IAB node on a first link (e.g., a backhaul link) (e.g., MT unit operation of the child IAB node) and resources allocated for communication between the child IAB node and child nodes (e.g., other IAB nodes or UEs) of the child IAB node on respective second links (e.g., DU operation of the child IAB node). In some examples, triggering conditions for the transmission of the guard symbols desired message from the child IAB node to the parent IAB node may be defined. In addition, guard symbols may be provided for both inter-slot transitions and intra-slot transitions. Furthermore, signaling options for indicating the SCS associated with guard symbols may be defined.

Figure 10:
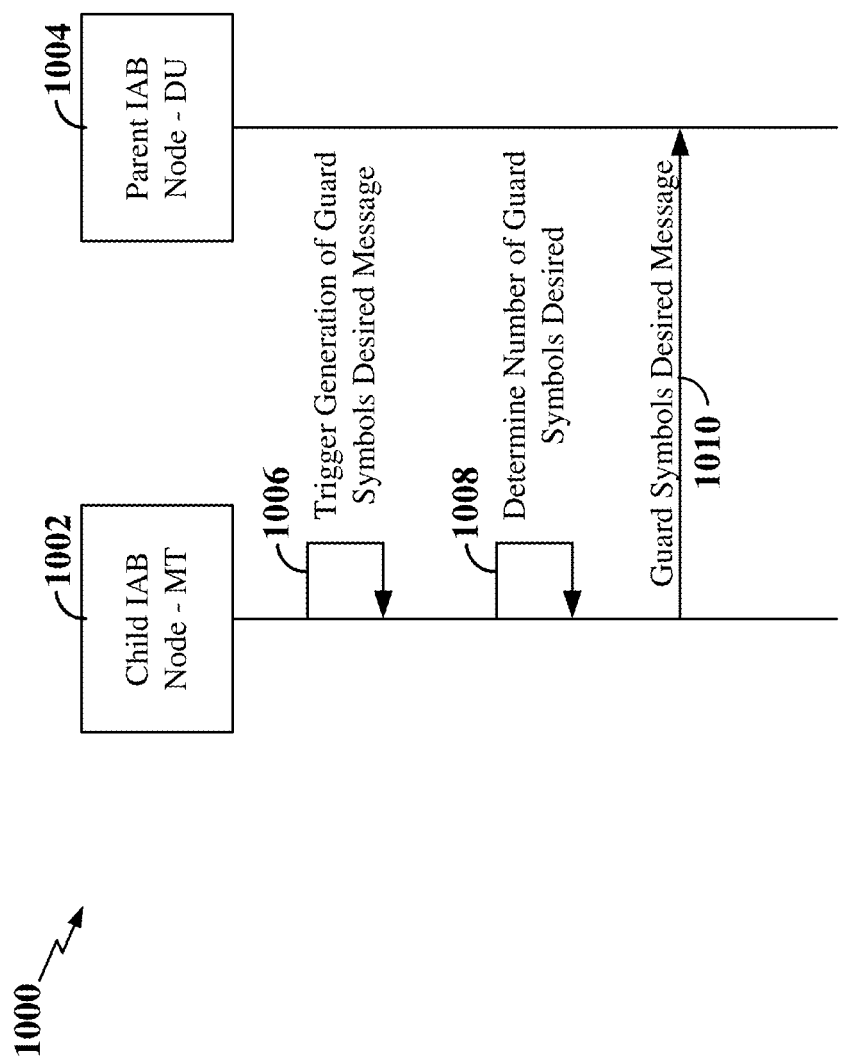
FIG. 10 is a diagram illustrating exemplary signaling for triggering the transmission of a guard symbols desired message in an IAB network according to some aspects.

FIG. 10 is a diagram illustrating exemplary signaling for triggering the transmission of a guard symbols desired message in an IAB network 1000. In the example shown in FIG. 10, a child IAB node 1002 (e.g., a MT unit of a child IAB node) is in wireless communication with a parent IAB node 1004 (e.g., a DU of a parent IAB node) over a backhaul link. The child IAB node 1002 may correspond, for example, to any of the IAB nodes illustrated in FIG. 4 or 5. The parent IAB node 1004 may correspond, for example, to any of the IAB nodes illustrated in FIG. 4 or 5.

In the example shown in FIG. 10, trigger conditions for the child IAB node 1002 to generate and transmit the guard symbols desired message to the parent IAB node 1004 may be defined. At 1006, the child IAB node 1002 may trigger generation of the guard symbols desired message either periodically or upon the occurrence of an event. For example, the child IAB node 1002 may trigger generation of the guard symbols desired message once each frame or with other suitable periodicity. As another example, the child IAB node 1002 may trigger the generation of the guard symbols desired message to the parent IAB node upon integration of the child IAB node into the IAB network 1000. As another example, the child IAB node 1002 may trigger the generation of the guard symbols desired message upon determining a change in the round trip time (RTT) between the child IAB node 1002 and the parent IAB node 1004 or a change in the pathloss on the backhaul link between the child IAB node 1002 and the parent IAB node 1004. For example, the child IAB node may compare the RTT and/or pathloss to a respective threshold and trigger the generation of the guard symbols desired message when the RTT and/or pathloss exceeds the respective threshold. The thresholds may be configured or preconfigured on the child IAB node 1002 or may be signaled to the child IAB node 1002 from the parent IAB node 1004. It should be understood that the present disclosure is not limited to the events described herein and other suitable events may be utilized to trigger the generation of the guard symbols desired message.

At 1008, the child IAB node 1002 may determine the number of guard symbols desired. For example, the child IAB node 1002 may determine the number of guard symbols desired based on at least one or more of the propagation delay, the TA value utilized for uplink transmissions to the parent IAB node 1004, the time required for switching between transmitting and receiving, and the time required for switching the analog beam width. In some examples, the child IAB node 1002 may determine a respective number of guard symbols desired for each of the switch types.

At 1010, the child IAB node 1002 may generate and transmit the guard symbols desired message to the parent IAB node 1004 requesting the parent IAB node 1004 provide the determined number of guard symbols at transitions between transmission/reception by the MT unit of the child IAB node 1002 and transmission/reception by the DU of the child IAB node 1002. In some examples, the guard symbols desired message may be transmitted within a medium access control—control element (MAC-CE).

Figure 11:
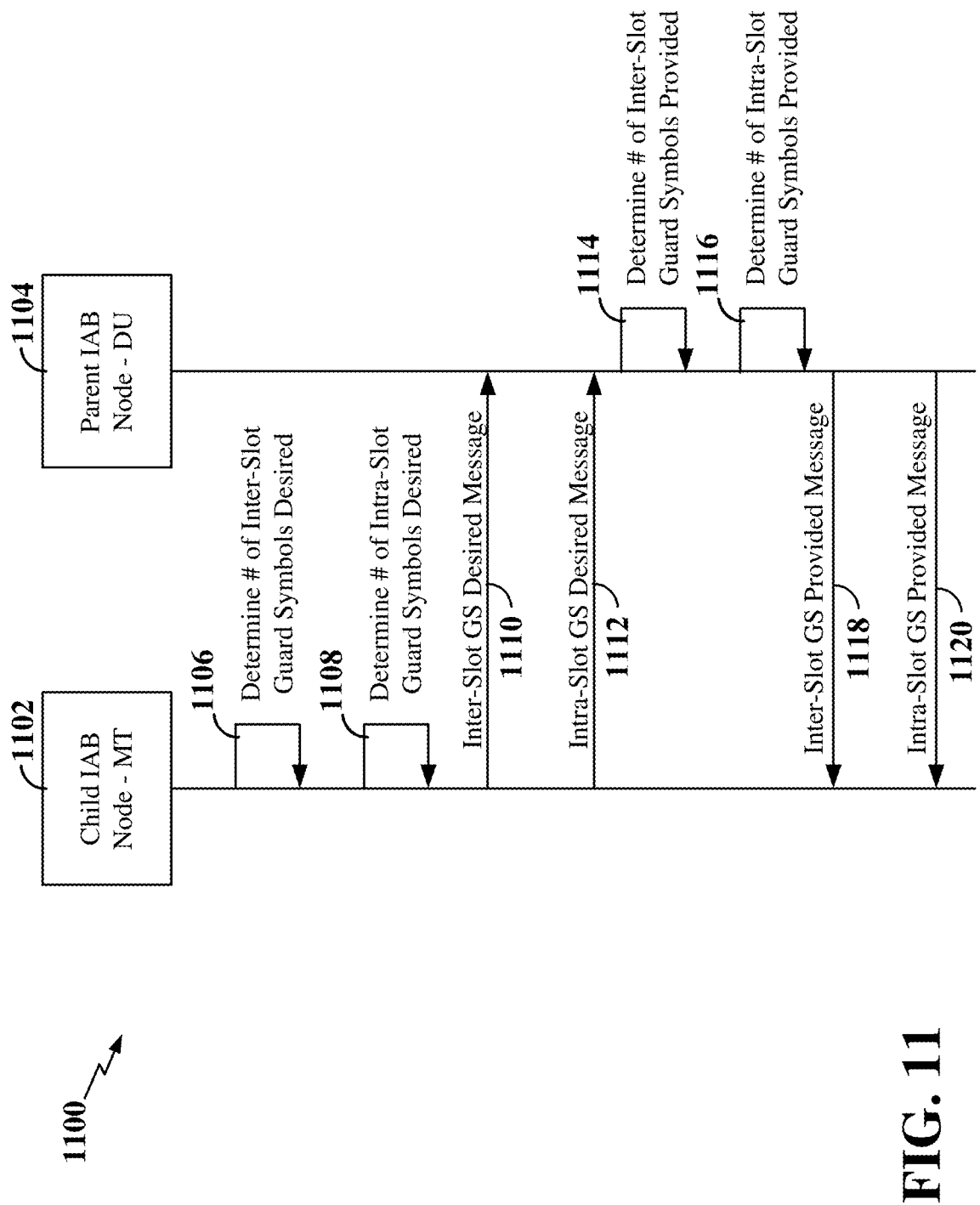
FIG. 11 is a diagram illustrating exemplary signaling for providing guard symbols at inter-slot and intra-slot transitions in an IAB network according to some aspects.

FIG. 11 is a diagram illustrating exemplary signaling for providing guard symbols at inter-slot and intra-slot transitions in an IAB network 1100. In the example shown in FIG. 11, a child IAB node 1102 (e.g., a MT unit of a child IAB node) is in wireless communication with a parent IAB node 1104 (e.g., a DU of a parent IAB node) over a backhaul link. The child IAB node 1102 may correspond, for example, to any of the IAB nodes illustrated in FIG. 4 or 5. The parent IAB node 1104 may correspond, for example, to any of the IAB nodes illustrated in FIG. 4 or 5.

In some examples, transitions may occur both between consecutive slots and within a slot. For example, a transition may occur between a first slot allocated for communication between the parent IAB node and the child IAB node on a first link (e.g., a backhaul link) and a second slot allocated for communication between the child IAB node and a set of one or more child nodes over respective second links (e.g., access or backhaul links). Here, the first and second slots are consecutive. In addition, a transition may occur between resources allocated within a slot for communication between the parent IAB node and the child IAB node on a first link (e.g., a backhaul link) and resources allocated within the same slot for communication between the child IAB node and a set of one or more child nodes over respective second links (e.g., access or backhaul links). Therefore, guard symbols may be provided for both inter-slot transitions and intra-slot transitions.

In the example shown in FIGS. 11, at 1106 and 1108, the child IAB node 1102 may determine the number of inter-slot guard symbols desired and the number of intra-slot guard symbols desired. For example, the child IAB node 1102 may determine the number of inter-slot guard symbols and intra-slot guard symbols desired based on at least one or more of the propagation delay, the TA value utilized for uplink transmissions to the parent IAB node 1104, the time required for switching between transmitting and receiving, and the time required for switching the analog beam width. In addition, the child IAB node 1102 may further determine the number of intra-slot guard symbols based on the resource utilization by the child IAB node 1102 on the first link, the congestion on the respective second links, the link quality of the first link and the respective second links, the number of child nodes served by the child IAB node 1102, and/or other suitable factors. In some examples, the child IAB node 1102 may determine a respective number of intra-slot and inter-slot guard symbols desired for each of the switch types.

At 1110, the child IAB node 1102 may generate and transmit an inter-slot guard symbols desired message to the parent IAB node 1104 requesting the parent IAB node 1104 provide the determined number of inter-slot guard symbols at slot boundary transitions between transmission/reception by the MT unit of the child IAB node 1102 and transmission/reception by the DU of the child IAB node 1102. In some examples, the inter-slot guard symbols desired message may be transmitted within a medium access control-control element (MAC-CE).

At 1112, the child IAB node 1102 may generate and transmit an intra-slot guard symbols desired message to the parent IAB node 1104 requesting the parent IAB node 1104 provide the determined number of intra-slot guard symbols at transitions that occur within a slot between transmission/reception by the MT unit of the child IAB node 1102 and transmission/reception by the DU of the child IAB node 1102. In some examples, the intra-slot guard symbols desired message may be transmitted within a medium access control-control element (MAC-CE). In some examples, the requested number of intra-slot guard symbols may be the same as the requested number of inter-slot guard symbols. In this example, the child IAB node 1102 may generate and transmit a single guard symbols desired message applicable to both intra-slot transitions and inter-slot transitions.

At 1114 and 1116, the parent IAB node 1104 may determine the number of inter-slot guard symbols desired and the number of intra-slot guard symbols provided. For example, the parent IAB node 1104 may determine the number of inter-slot guard symbols and intra-slot guard symbols provided based on the number of inter-slot guard symbols and intra-slot guard symbols requested by the child IAB node 1102, the resource utilization by the child IAB node 1102 on the first link, the congestion on other links associated with the parent IAB node DU, the link quality of the first link, the number of child nodes served by the parent IAB node 1104, and/or other suitable factors.

In some examples, the parent IAB node 1104 may determine a respective number of intra-slot and inter-slot guard symbols provided for each of the switch types. In some examples, the parent IAB node 1104 may provide a smaller number of guard symbols for intra-slot transitions since the allocated resources for communication with the child IAB node 1102 on the first link may be smaller (e.g., only a portion of a slot). For example, the provided intra-slot guard symbols may be set to zero. The child IAB node 1102 may then avoid or resolve any transition conflicts due to the smaller number of intra-slot guard symbols provided.

At 1118, the parent IAB node 1104 may generate and transmit an inter-slot guard symbols provided message to the child IAB node 1102 indicating the number of inter-slot guard symbols provided by the parent IAB node 1104 at slot boundary transitions between transmission/reception by the MT unit of the child IAB node 1102 and transmission/reception by the DU of the child IAB node 1102. In some examples, the inter-slot guard symbols provided message may be transmitted within a medium access control-control element (MAC-CE).

At 1120, the parent IAB node 1104 may generate and transmit an intra-slot guard symbols provided message to the child IAB node 1102 indicating the number of intra-slot guard symbols provided by the parent IAB node 1104 at transitions that occur within a slot between transmission/reception by the MT unit of the child IAB node 1102 and transmission/reception by the DU of the child IAB node 1102. In some examples, the intra-slot guard symbols provided message may be transmitted within a medium access control-control element (MAC-CE). In some examples, the provided number of intra-slot guard symbols may be the same as the provided number of inter-slot guard symbols. In this example, the parent IAB node 1104 may generate and transmit a single guard symbols provided message applicable to both intra-slot transitions and inter-slot transitions.

In some examples, the child IAB node 1102 and parent IAB node 1104 may utilize a first SCS for communication on the first link, while the child IAB node 1102 may utilize a second SCS (different than the first SCS) for communication on the respective second links with child nodes of the child IAB node 1102. In this example, there may be ambiguity as to whether a transition is an intra-slot transition or an intra-slot transition.

Figure 12:
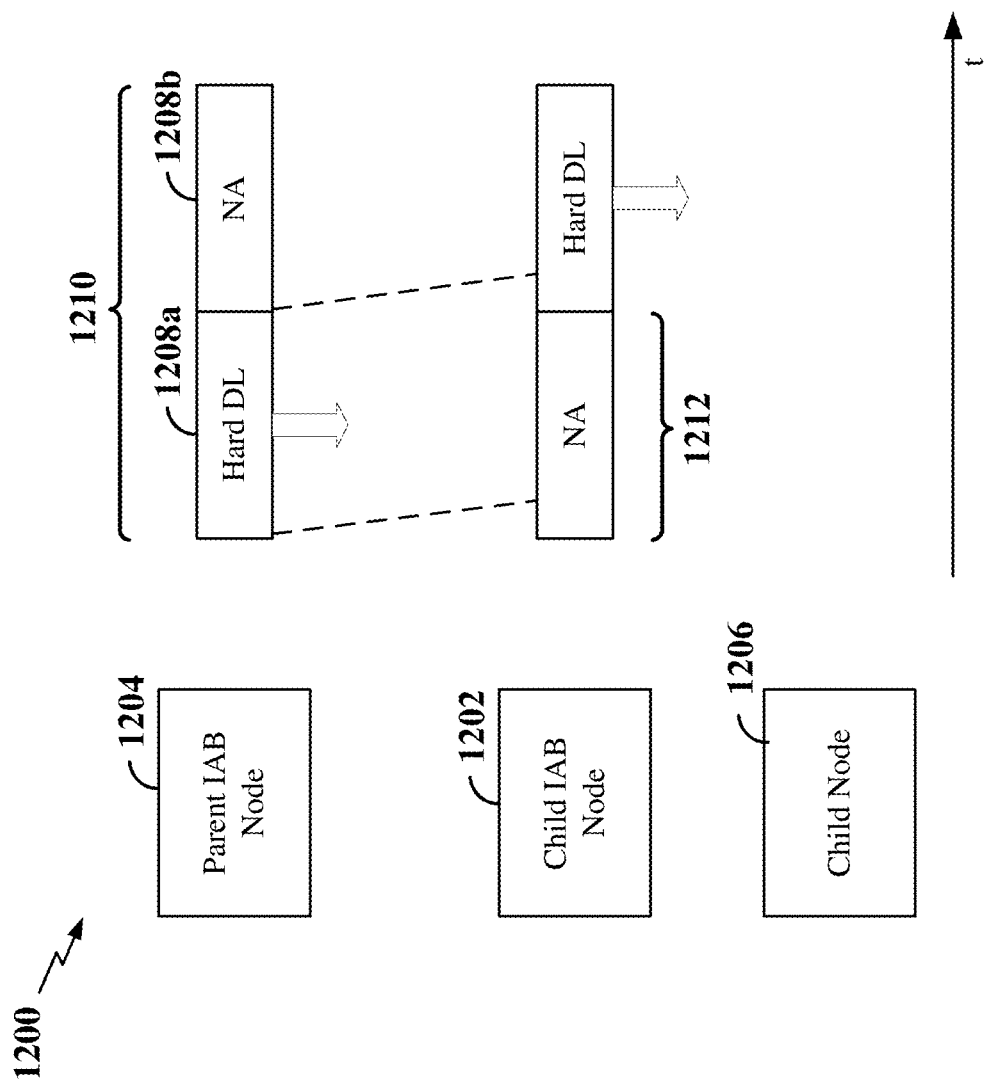
FIG. 12 is a diagram illustrating an example of inter-slot and intra-slot transitions in an IAB network resulting from different subcarrier spacings according to some aspects.

FIG. 12 is a diagram illustrating an example of inter-slot and intra-slot transitions resulting from different SCSs in an IAB network 1200. In the example shown in FIG. 12, a parent IAB node 1204 is in wireless communication with a child IAB node 1202 via a first (e.g., backhaul) link. The child IAB node 1202 is further in wireless communication with a child node 1206 (e.g., another IAB node or UE) via a second (e.g., backhaul or access) link. Each IAB node 1202 and 1204 may correspond, for example, to any of the IAB nodes illustrates in FIG. 4 or 5.

In the example shown in FIG. 12, resources are shown time-divided into two sets of resources 1208a and 1208b. The first set of resources 1208a is shown allocated to the parent IAB node DU 1204 as a hard DL resource and to the child IAB node DU 1202 as not available. The second set of resources 1208b is shown allocated to the parent IAB node DU 1204 as not available and to the child IAB node DU 1202 as a hard DL resource. Therefore, the parent IAB node DU 1204 may use the first set of resources 1208a to transmit downlink information (e.g., downlink control and/or data) to the MT unit of the child IAB node 1202 via the first link. The second set of resources 1208b may then be used by the child IAB node DU 1202 to transmit downlink information (e.g., downlink control and/or data) to the child node 1206 via the second link.

In the example shown in FIG. 12, the child IAB node 1202 utilizes a first SCS (e.g., SCS1) for communication with the parent IAB node 1204 on the first link and a second SCS (e.g., SCS2) different than the first SCS for communication with the child node 1206 on the second link. In particular, the first SCS is illustrated as being half of the second SCS (e.g., SCS2=2*SCS1). As such, the first set of resources 1208a and the second set of resources 1208b form a single slot 1210 on the first link. In addition, the first set of resources 1208a and the second set of resources 1208b form separate consecutive slots 1212 on the second link. Therefore, the transition of child IAB node from the MT unit to the DU between the first set of resources 1208a and the second set of resources 1208b may be considered to be either an inter-slot transition or an intra-slot transition depending on the SCS utilized to define the transition.

To resolve the ambiguity in the transition type (e.g., inter-slot or intra-slot), a reference SCS may be utilized by the parent IAB node 1204 and the child IAB node 1202 to identify the transition type. For example, the reference SCS may be one of the first SCS or the second SCS. In some examples, the child IAB node 1202 may include an indication of a requested SCS in the guard symbols desired message transmitted to the parent IAB node 1204. In some examples, the requested SCS may be the second SCS. The parent IAB node 1204 may further include an indication of either the first SCS or the second SCS associated with the provided guard symbols in the guard symbols provided message transmitted to the child IAB node 1202. The child IAB node 1202 has knowledge of the first SCS based on communication with the parent IAB node 1204 over the first link. The parent IAB node 1204 has knowledge of the second SCS based on the inclusion of the indication of the second SCS in the guard symbols desired message.

In this example, each of the child IAB node 1202 and the parent IAB node 1204 may be configured to select one of the first SCS or the second SCS as the reference SCS based on one or more rules. For example, the child IAB node 1202 and the parent IAB node 1204 may each be configured to select as a reference SCS the maximum SCS between the requested SCS and the provided SCS, the minimum SCS between the requested SCS and the provided SCS, the first SCS, or the second SCS (if included as the requested SCS in the guard symbols desired message).

In some examples, the child IAB node 1202 may not include the indication of the second SCS with the guard symbols desired message. In this example, the child IAB node 1202 and parent IAB node 1204 may be configured to select as a reference SCS the first SCS included with the guard symbols provided message transmitted from the parent IAB node 1204 to the child IAB node 1202. Based on the selected reference SCS, the parent IAB node 1204 and child IAB node 1202 may each be able to identify whether a transition is an intra-slot transition or an inter-slot transition and apply the correct number of guard symbols and corresponding SCS to the transition.

Figure 13:
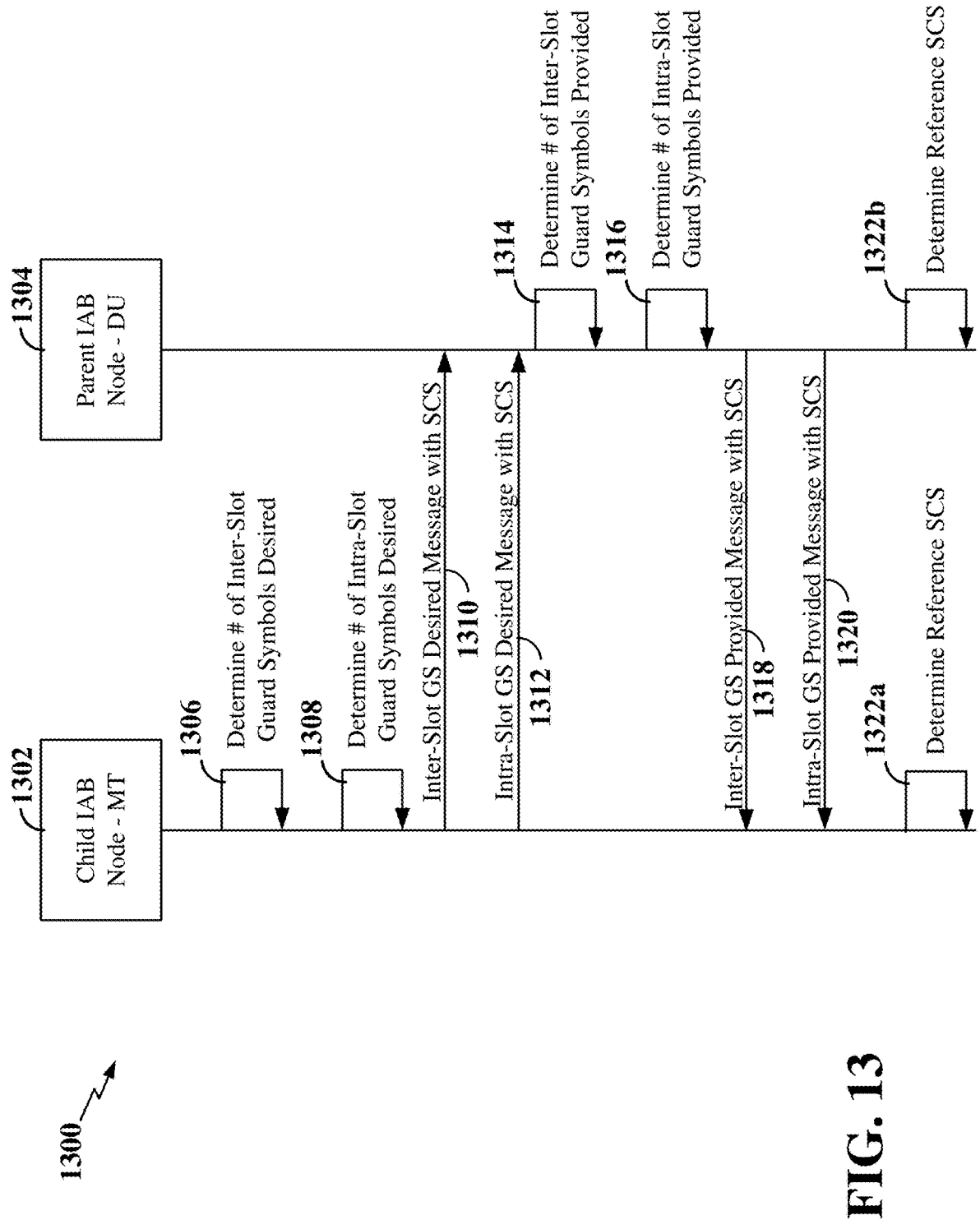
FIG. 13 is a diagram illustrating exemplary signaling for providing a reference subcarrier spacing for use in identifying inter-slot and intra-slot transitions in an IAB network according to some aspects.

FIG. 13 is a diagram illustrating exemplary signaling for providing a reference subcarrier spacing for use in identifying inter-slot and intra-slot transitions in an IAB network 1300. In the example shown in FIG. 13, a child IAB node 1302 (e.g., a MT unit of a child IAB node) is in wireless communication with a parent IAB node 1304 (e.g., a DU of a parent IAB node) over a backhaul link. The child IAB node 1302 may correspond, for example, to any of the IAB nodes illustrated in FIG. 4 or 5. The parent IAB node 1304 may correspond, for example, to any of the IAB nodes illustrated in FIG. 4 or 5.

At 1306 and 1308, the child IAB node 1302 may determine the number of inter-slot guard symbols desired and the number of intra-slot guard symbols desired. For example, the child IAB node 1302 may determine the number of inter-slot guard symbols and intra-slot guard symbols desired based on at least one or more of the propagation delay, the TA value utilized for uplink transmissions to the parent IAB node 1304, the time required for switching between transmitting and receiving, and the time required for switching the analog beam width. In addition, the child IAB node 1302 may further determine the number of intra-slot guard symbols based on the resource utilization by the child IAB node 1302 on the first link, the congestion on the respective second links, the link quality of the first link and the respective second links, the number of child nodes served by the child IAB node 1302, and/or other suitable factors. In some examples, the child IAB node 1302 may determine a respective number of intra-slot and inter-slot guard symbols desired for each of the switch types.

At 1310, the child IAB node 1302 may generate and transmit an inter-slot guard symbols desired message to the parent IAB node 1304 requesting the parent IAB node 1304 provide the determined number of inter-slot guard symbols at slot boundary transitions between transmission/reception by the MT unit of the child IAB node 1302 and transmission/reception by the DU of the child IAB node 1302. The child IAB node 1302 may further include an SCS requested for the inter-slot guard symbols. In some examples, the requested SCS is the second SCS utilized by the child IAB node 1302 for communication on the respective second links with child nodes of the child IAB node. In some examples, the inter-slot guard symbols desired message, together with the requested SCS, may be transmitted within a medium access control-control element (MAC-CE).

At 1312, the child IAB node 1302 may generate and transmit an intra-slot guard symbols desired message to the parent IAB node 1304 requesting the parent IAB node 1304 provide the determined number of intra-slot guard symbols at transitions that occur within a slot between transmission/reception by the MT unit of the child IAB node 1302 and transmission/reception by the DU of the child IAB node 1302. In some examples, the intra-slot guard symbols desired message may further include the requested SCS. In other examples, only one of the inter-slot guard symbols desired message or intra-slot guard symbols desired message may include the requested SCS. In some examples, the intra-slot guard symbols desired message, together with the requested SCS, may be transmitted within a medium access control-control element (MAC-CE). In some examples, the requested number of intra-slot guard symbols may be the same as the requested number of inter-slot guard symbols. In this example, the child IAB node 1302 may generate and transmit a single guard symbols desired message with the requested SCS applicable to both intra-slot transitions and inter-slot transitions.

At 1314 and 1316, the parent IAB node 1304 may determine the number of inter-slot guard symbols provided and the number of intra-slot guard symbols provided. For example, the parent IAB node 1304 may determine the number of inter-slot guard symbols and intra-slot guard symbols provided based on the number of inter-slot guard symbols and intra-slot guard symbols requested by the child IAB node 1302, the resource utilization by the child IAB node 1302 on the first link, the congestion on other links associated with the parent IAB node DU, the link quality of the first link, the number of child nodes served by the parent IAB node 1304, and/or other suitable factors.

In some examples, the parent IAB node 1304 may determine a respective number of intra-slot and inter-slot guard symbols provided for each of the switch types. In some examples, the parent IAB node 1304 may provide a smaller number of guard symbols for intra-slot transitions since the allocated resources for communication with the child IAB node 1302 on the first link may be smaller (e.g., only a portion of a slot). For example, the provided intra-slot guard symbols may be set to zero. The child IAB node 1302 may then avoid or resolve any transition conflicts due to the smaller number of intra-slot guard symbols provided.

At 1318, the parent IAB node 1304 may generate and transmit an inter-slot guard symbols provided message to the child IAB node 1302 indicating the number of inter-slot guard symbols provided by the parent IAB node 1304 at slot boundary transitions between transmission/reception by the MT unit of the child IAB node 1302 and transmission/reception by the DU of the child IAB node 1302. The parent IAB node 1304 may further include an SCS provided for the inter-slot guard symbols. In some examples, the provided SCS may be a first SCS utilized by the parent IAB node 1304 for communication on the first link with the child IAB node 1302. In other examples, the provided SCS may include the second SCS (e.g., which may have been requested by the child IAB node 1302). In some examples, the inter-slot guard symbols provided message, together with the provided SCS, may be transmitted within a medium access control—control element (MAC-CE).

At 1320, the parent IAB node 1304 may generate and transmit an intra-slot guard symbols provided message to the child IAB node 1302 indicating the number of intra-slot guard symbols provided by the parent IAB node 1304 at transitions that occur within a slot between transmission/reception by the MT unit of the child IAB node 1302 and transmission/reception by the DU of the child IAB node 1302. The parent IAB node 1304 may further include the provided SCS. In some examples, the intra-slot guard symbols provided message may be transmitted within a medium access control-control element (MAC-CE). In some examples, the provided number of intra-slot guard symbols may be the same as the provided number of inter-slot guard symbols. In this example, the parent IAB node 1304 may generate and transmit a single guard symbols provided message with the provided SCS applicable to both intra-slot transitions and inter-slot transitions.

At 1322a and 1322b, the child IAB node 1302 and parent IAB node 1304 may each determine a reference SCS for use in identifying transitions as inter-slot transitions or inter-slot transitions. In examples in which a requested SCS is not included in the inter-slot or intra-slot guard symbols desired message, the child IAB node 1302 and parent IAB node 1304 may each select the provided SCS included in the inter/intra-slot guard symbols provided message. In examples in which a requested SCS is included in the inter-slot and/or intra-slot guard symbols desired message, the child IAB node 1302 and parent IAB node 1304 may each select the reference SCS based on a preconfigured rule. For example, the rule may indicate that the child IAB node 1302 and parent IAB node 1304 should select as the reference SCS the maximum SCS between the requested SCS and the provided SCS, the minimum SCS between the requested SCS and the provided SCS, the first SCS, or the second SCS (if included as the requested SCS in the guard symbols desired message).

Figure 14:
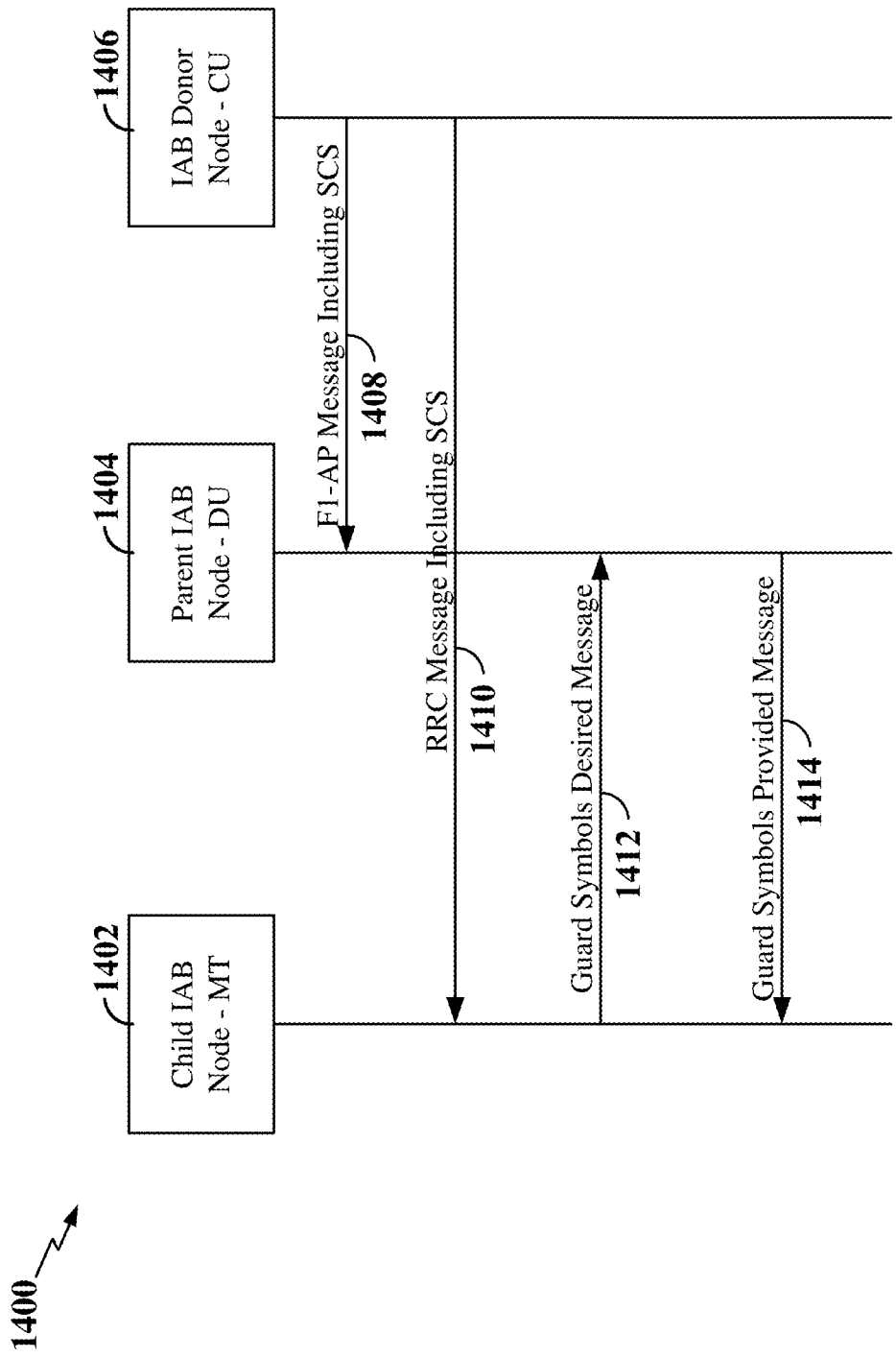
FIG. 14 is a diagram illustrating exemplary signaling for providing an SCS associated with guard symbols providing a gap at transitions in an IAB network according to some aspects.

FIG. 14 is a diagram illustrating exemplary signaling for providing an SCS associated with guard symbols providing a gap at transitions in an IAB network 1400. In the example shown in FIG. 14, a child IAB node 1402 (e.g., a MT unit of a child IAB node) is in wireless communication with a parent IAB node 1404 (e.g., a DU of a parent IAB node) over a backhaul link. In addition, each of the parent IAB node 1404 and child IAB node 1402 are in communication with an IAB donor node 1406 (e.g., a CU of the IAB donor node) via one or more backhaul links. The child IAB node 1402 may correspond, for example, to any of the IAB nodes illustrated in FIG. 4 or 5. The parent IAB node 1404 may correspond, for example, to any of the IAB nodes illustrated in FIG. 4 or 5. The IAB donor node 1406 may correspond to the IAB donor node illustrated in FIG. 4 or 5.

In the example shown in FIG. 14, the SCS associated with guard symbols provided at transitions between the MT unit and DU of the child IAB node 1402 is centrally determined by the IAB donor node 1406. Thus, at 1408, the IAB donor node 1406 may generate and transmit an F1-Application Protocol (AP) message including the SCS to the parent IAB node 1404. In addition, at 1410, the IAB donor node 1406 may further generate and transmit a radio resource control (RRC) message including the SCS to the child IAB node 1402. In some examples, the SCS may include a single SCS for all switch types. In other examples, the SCS may include a respective SCS for each switch type. For example, uplink and downlink communications on the backhaul link between the child IAB node 1402 and the parent IAB node 1404 may operate at different bandwidth parts, each with a different SCS. Therefore, the SCS associated with guard symbols provided at transitions of the child IAB node may differ between switch types based on the different SCS utilized on the uplink and downlink. In some examples, the IAB donor node may further provide a reference SCS for use by the parent IAB node 1404 and child IAB node 1402 in identifying a transition as an intra-slot transition or an inter-slot transition. The reference SCS may be the SCS included in the respective messages or may be a separate SCS that is included in the respective messages.

At 1412, the child IAB node 1402 may generate and transmit a guard symbols desired message to the parent IAB node 1404 requesting the parent IAB node 1404 provide the determined number of guard symbols at transitions between transmission/reception by the MT unit of the child IAB node 1402 and transmission/reception by the DU of the child IAB node 1402. In some examples, the guard symbols desired message may be transmitted within a medium access control—control element (MAC-CE).

At 1414, the parent IAB node 1404 may then generate and transmit a guard symbols provided message to the child IAB node 1402 indicating the number of guard symbols provided by the parent IAB node 1404 at transitions between transmission/reception by the MT unit of the child IAB node 1402 and transmission/reception by the DU of the child IAB node 1402. In some examples, the inter-slot guard symbols provided message may be transmitted within a medium access control-control element (MAC-CE).

In some examples, instead of the IAB donor node providing the SCS, the SCS may be included in the MAC-CE including the guard symbols desired message and/or the MAC-CE including the guard symbols provided message. In other examples, the SCS may be a default SCS configured or preconfigured on the child IAB node 1402 and parent IAB node 1404. For example, the default SCS may be equal to the SCS of the active bandwidth part within which the parent IAB node 1404 and the child IAB node 1402 are communicating. In this example, the number of guard symbols provided may change as the default SCS changes.

Figure 15:
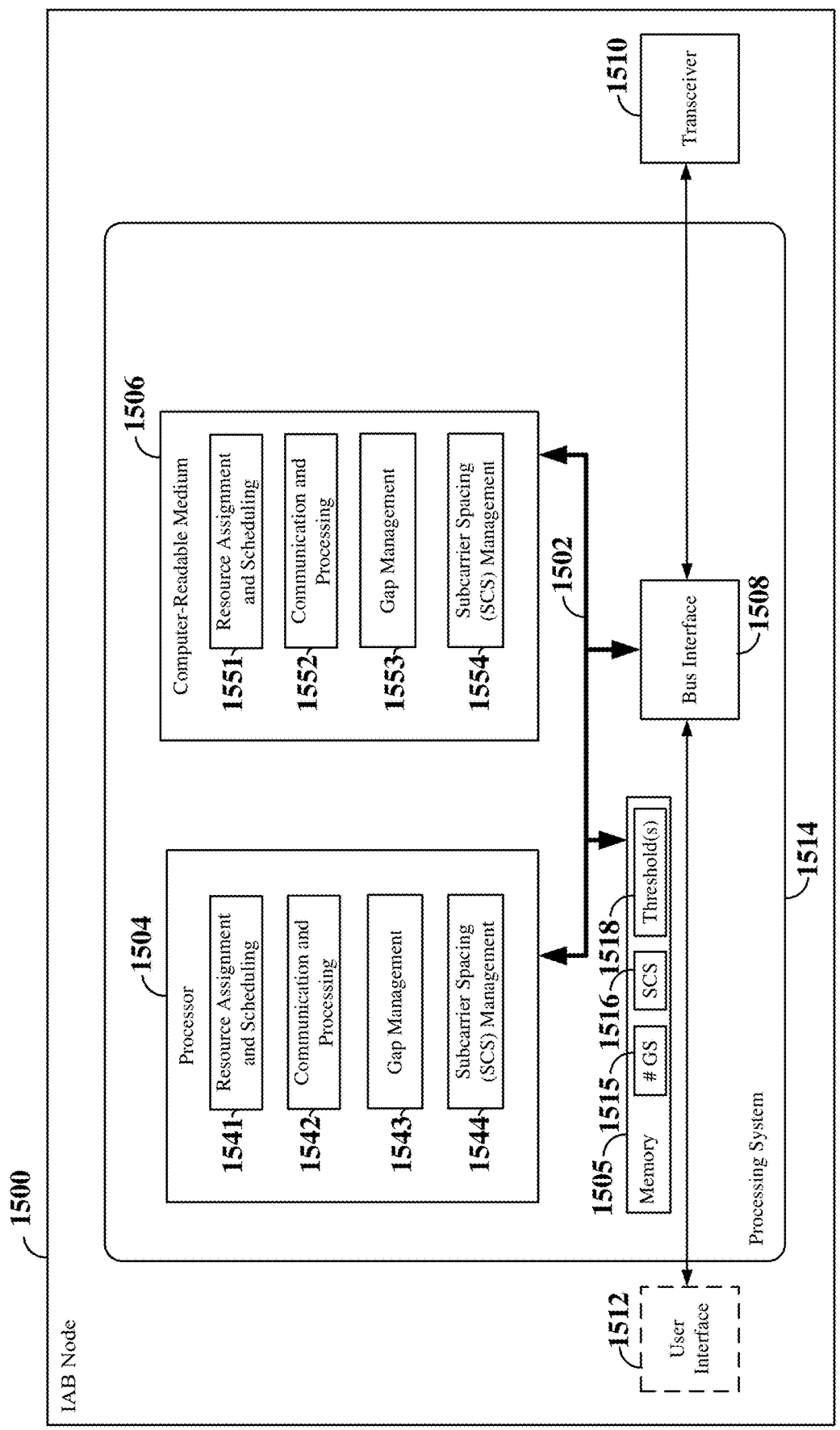
FIG. 15 is a block diagram illustrating an example of a hardware implementation for an IAB node employing a processing system according to some aspects.

FIG. 15 is a block diagram illustrating an example of a hardware implementation for an IAB node 1500 employing a processing system 1514. For example, the IAB node 1500 may be a child IAB node, a parent IAB node, or an IAB donor node, as illustrated in any one or more of FIGS. 4-7 and 10-14.

The IAB node 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the IAB node 1500 may be configured to perform any one or more of the functions described herein. That is, the processor 1504, as utilized in an IAB node 1500, may be used to implement any one or more of the processes and procedures described below.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a transmission medium (e.g., air). Depending upon the nature of the apparatus, a user interface 1512 (e.g., keypad, display, speaker, microphone, joystick, touchscreen) may also be provided. Of course, such a user interface 1512 is optional, and may be omitted in some examples.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1504 may include circuitry configured for various functions. In examples in which the IAB node 1500 includes a child IAB node DU, a parent IAB node DU or an IAB donor node CU, the processor 1504 may include resource assignment and scheduling circuitry 1541, configured to generate, schedule, and modify a resource assignment or grant of time-frequency resources (e.g., a set of one or more resource elements) to a set of one or more child nodes of the IAB node. For example, the resource assignment and scheduling circuitry 1541 may schedule time-frequency resources within a plurality of time division duplex (TDD) and/or frequency division duplex (FDD) slots to carry user data traffic and/or control information to and/or from the set of one or more child nodes (e.g., UEs or child IAB nodes).

In various aspects of the disclosure, the resource assignment and scheduling circuitry 1541 may further be configured to schedule the transmission of a guard symbols desired message and a guard symbols provided message when the IAB node is a parent IAB node DU. In some examples, the guard symbols desired message may include an inter-slot guard symbols desired message and an intra-slot guard symbols desired message. In addition, the guard symbols provided message may include an inter-slot guard symbols provided message and an intra-slot guard symbols provided message. In examples in which the IAB node is an IAB donor node, the resource assignment and scheduling circuitry 1541 may be configured to schedule the transmission of an F1-AP message including the SCS associated with guard symbols provided at transitions of a child IAB node to the parent IAB node of the child IAB node. In addition, the resource assignment and scheduling circuitry 1541 may be configured to schedule the transmission of an RRC message including the SCS to the child IAB node. The resource assignment and scheduling circuitry 1541 may further be configured to execute resource assignment and scheduling software 1551 included on the computer-readable medium 1506 to implement one or more functions described herein.

The processor 1504 may further include communication and processing circuitry 1542, configured to communicate with other IAB nodes and/or UEs in the IAB network. In some examples, the communication and processing circuitry 1542 may include one or more hardware components that provide the physical structure that performs processes related to wireless communication (e.g., signal reception and/or signal transmission) and signal processing (e.g., processing a received signal and/or processing a signal for transmission).

In examples in which the IAB node is a child IAB node, the communication and processing circuitry 1542 may further be configured to communicate with a parent IAB node via a first link (e.g., a backhaul link) and a set of one or more child nodes (e.g., UEs or child IAB nodes) via respective second links (e.g., access or backhaul links). For example, the communication and processing circuitry 1542 may be configured to generate and transmit a guard symbols desired message to the parent IAB node via the transceiver 1510 on the resources allocated by the parent IAB node. The guard symbols desired message may further include a requested SCS to be associated with the requested number of guard symbols. In some examples, the guard symbols desired message may include a single number of requested guard symbols (optionally with an associated SCS) for any switch type involved in a transition. In other examples, the guard symbols desired message may include a respective number of requested guard symbols (optionally with a respective SCS) for each switch type. The guard symbols desired message may include an inter-slot guard symbols desired message and an intra-slot guard symbols desired message. One or both of the inter-slot and intra-slot guard symbols desired message may further include the requested SCS. In addition, each of the inter-slot and intra-slot guard symbols desired messages may request a respective number of guard symbols (and optionally a respective SCS) for each switch type.

The communication and processing circuitry 1542 may further be configured to receive a guard symbols provided message via the transceiver 1510 on the resources allocated by the parent IAB node. The guard symbols provided message may further include a requested SCS to be associated with the provided number of guard symbols. In some examples, the guard symbols provided message may include a single number of provided guard symbols (optionally with an associated SCS) for any switch type involved in a transition. In other examples, the guard symbols provided message may include a respective number of provided guard symbols (optionally with a respective SCS) for each switch type. The guard symbols provided message may include an inter-slot guard symbols provided message and an intra-slot guard symbols provided message. One or both of the inter-slot and intra-slot guard symbols provided message may further include the provided SCS. In addition, each of the inter-slot and intra-slot guard symbols provided messages may provide a respective number of guard symbols (and optionally a respective SCS) for each switch type. The communication and processing circuitry 1542 may further be configured to receive an RRC message from an IAB donor node including an SCS associated with guard symbols provided at transitions of the child IAB node. In some examples, the RRC message may further indicate a reference SCS for use in identifying inter-slot and intra-slot transitions.

In examples in which the IAB node is a parent IAB node, the communication and processing circuitry 1542 may further be configured to communicate with a child IAB node via a first link (e.g., a backhaul link). For example, the communication and processing circuitry 1542 may be configured to receive a guard symbols desired message, as described above, from the child IAB node via the transceiver 1510 on the resources allocated by the resource assignment and scheduling circuitry 1541. The communication and processing circuitry 1542 may further be configured to generate and transmit a guard symbols provided message, as described above, via the transceiver 1510 on the resources allocated by the resource assignment and scheduling circuitry 1541. The communication and processing circuitry 1542 may further be configured to receive an F1-AP message from an IAB donor node including an SCS associated with guard symbols provided at transitions of the child IAB node. In some examples, the F1-AP message may further indicate a reference SCS for use in identifying inter-slot and intra-slot transitions.

In examples in which the IAB node is an IAB donor node, the communication and processing circuitry 1542 may be configured to communicate with a parent IAB node and a child IAB node in the IAB network via one or more backhaul links. For example, the communication and processing circuitry 1542 may be configured to generate and transmit an RRC message to the child IAB node including an SCS associated with guard symbols provided at transitions of the child IAB node. In some examples, the RRC message may further indicate a reference SCS for use in identifying inter-slot and intra-slot transitions. In addition, the communication and processing circuitry 1542 may be configured to generate and transmit an F1-AP message to the parent IAB node including an SCS associated with guard symbols provided at transitions of the child IAB node. In some examples, the F1-AP message may further indicate a reference SCS for use in identifying inter-slot and intra-slot transitions. The communication and processing circuitry 1542 may further be configured to execute communication and processing software 1552 included on the computer-readable medium 1506 to implement one or more functions described herein.

The processor 1504 may further include gap management circuitry 1543, configured to determine a number of guard symbols to be provided at transitions between MT communication and DU communication on a child IAB node in the IAB network. The number of guard symbols (#GS) 1515 may be stored, for example, in memory 1505. In some examples, the number of guard symbols 1515 may be stored as a table indicating a respective number of guard symbols for each switch type. For example, the number of guard symbols 1515 in the memory 1505 may include the table 900 shown in FIG. 9.

In examples in which the IAB node is a child IAB node, the gap management circuitry 1543 may be configured to trigger generation and transmission of a guard symbols desired message to the parent IAB node requesting the parent IAB node to provide a number of guard symbols at transitions of the child IAB node. In some examples, the gap management circuitry 1543 may trigger generation of the guard symbols desired message either periodically or upon the occurrence of an event. For example, the gap management circuitry 1543 may trigger the generation of the guard symbols desired message once each frame or with other suitable periodicity. As another example, the gap management circuitry 1543 may trigger the generation of the guard symbols desired message to the parent IAB node upon integration of the child IAB node into the IAB network.

As another example, the gap management circuitry 1543 may trigger the generation of the guard symbols desired message upon determining a change in the round trip time (RTT) between the child IAB node and the parent IAB node or a change in the pathloss on the backhaul link between the child IAB node and the parent IAB node. For example, the memory 1505 may include one or more thresholds 1518 against which the RTT and/or pathloss may be compared. In some examples, the gap management circuitry 1543 may measure the RTT and compare the RTT to an RTT threshold 1518. The gap management circuitry 1543 may trigger the generation of the guard symbols desired message by the communication and processing circuitry 1542 when the RTT exceeds the RTT threshold. In some examples, the gap management circuitry 1543 may measure the pathloss and compare the pathloss to a pathloss threshold 1518. The gap management circuitry 1543 may trigger the generation of the guard symbols desired message by the communication and processing circuitry 1542 when the pathloss exceeds the threshold. In some examples, the guard symbols desired message may include a respective requested number of guard symbols for each of a plurality of switch types.

The gap management circuitry 1543 may further be configured to determine a respective number of guard symbols desired for both inter-slot transitions and intra-slot transitions. If the same number of guard symbols are desired for both inter-slot and intra-slot transitions, the gap management circuitry 1543 may be configured to operate together with the communication and processing circuitry 1542 to generate and transmit a single guard symbols desired message to the parent IAB node requesting a number of guard symbols desired to be provided by the parent IAB at transitions of the child IAB node. The desired number of guard symbols may be applicable to both inter-slot and intra-slot transitions. If different numbers of guard symbols are desired for inter-slot transitions and intra-slot transitions, the gap management circuitry 1543 may further be configured to operate together with the communication and processing circuitry 1542 to generate and transmit an intra-slot guard symbols desired message and inter-slot guard symbols desired message, each requesting a respective number of guard symbols for inter-slot transitions and intra-slot transitions, respectively. In some examples, the desired number of guard symbols (for inter-slot and/or intra-slot transitions) may include a single number of guard symbols for each switch type. In other examples, the desired number of guard symbols (for inter-slot and/or intra-slot transitions) may include a respective number of guard symbols for each switch type.

The gap management circuitry 1543 may further be configured to operate together with the communication and processing circuitry 1542 to receive a guard symbols provided message from the parent IAB node indicating a number of guard symbols provided by the parent IAB node for both inter-slot and intra-slot transitions of the child IAB node. The gap management circuitry 1543 may further be configured to receive an inter-slot guard symbols provided message and an intra-slot guard symbols provided message from the parent IAB node, each indicating the respective provided number of guard symbols for inter-slot transitions and intra-slot transitions, respectively. In some examples, the provided number of guard symbols (for inter-slot and/or intra-slot transitions) may include a single number of guard symbols for each switch type. In other examples, the provided number of guard symbols (for inter-slot and/or intra-slot transitions) may include a respective number of guard symbols for each switch type. In some examples, the gap management circuitry 1543 may be configured to store the provided number of guard symbols (#GS) 1515 for inter-slot and intra-slot transitions within the memory 1505.

In examples in which the IAB node is a parent IAB node, the gap management circuitry 1543 may be configured to operate together with the communication and processing circuitry to receive one or more guard symbols desired message requesting the same or a respective number of guard symbols for intra-slot and inter-slot transitions of the child IAB node. The gap management circuitry 1543 may further be configured to determine a respective number of guard symbols desired for both inter-slot transitions and intra-slot transitions based on the respective requested number of guard symbols for inter-slot and intra-slot transitions and other factor(s). In some examples, the gap management circuitry 1543 may determine a respective number of intra-slot and inter-slot guard symbols provided for each of the switch types. In some examples, the gap management circuitry 1543 may provide a smaller number of guard symbols for intra-slot transitions than inter-slot transitions since the allocated resources for communication with the child IAB node may be smaller (e.g., only a portion of a slot). For example, the provided intra-slot guard symbols may be set to zero.

The gap management circuitry 1543 may further be configured to operate together with the communication and processing circuitry 1542 to generate and transmit a single guard symbols provided message to the child IAB node indicating the number of guard symbols provided for both inter-slot transitions and intra-slot transitions when the number of inter-slot guard symbols is the same as the number of intra-slot guard symbols. The gap management circuitry 1543 may further be configured to operate together with the communication and processing circuitry 1542 to generate and transmit an inter-slot guard symbols provided message and an intra-slot guard symbols provided message, each indicating the respective provided number of guard symbols for inter-slot transitions and intra-slot transitions, respectively. In some examples, the provided number of guard symbols (for inter-slot and/or intra-slot transitions) may include a single number of guard symbols for each switch type. In other examples, the provided number of guard symbols (for inter-slot and/or intra-slot transitions) may include a respective number of guard symbols for each switch type. The gap management circuitry 1543 may further be configured to store the provided number of guard symbols (for inter-slot and intra-slot transitions) within, for example, the memory 1505. The gap management circuitry 1543 may further be configured to execute gap management software 1553 included on the computer-readable medium 1506 to implement one or more functions described herein.

The processor 1504 may further include subcarrier spacing (SCS) management circuitry 1544, configured to determine an SCS associated with a number of guard symbols to be provided at transitions of a child IAB node. In examples in which the IAB node is the child IAB node, the SCS management circuitry 1544 may be configured to determine a desired SCS associated with a requested number of guard symbols. The SCS management circuitry 1544 may further be configured to operate together with the communication and processing circuitry 1542 to include the desired SCS within a MAC-CE including the guard symbols desired message for transmission to the parent IAB node. The SCS management circuitry 1544 may further be configured to receive a MAC-CE from the parent IAB node including the guard symbols provided message and a provided SCS associated with a provided number of guard symbols. The SCS management circuitry 1544 may further be configured to receive the provided SCS from an IAB donor node via an RRC message. The SCS management circuitry 1544 may further be configured to store the provided SCS 1516 within, for example, memory 1505. In some examples, the requested SCS and/or provided SCS may include a single SCS for each switch type. In other examples, the requested SCS and/or provided SCS may include a respective SCS for each of the switch types In examples in which the IAB node is the parent IAB node, the SCS management circuitry 1544 may be configured to receive a requested SCS in a MAC-CE including the guard symbols desired message from the child IAB node. The SCS management circuitry 1544 may further be configured to determine a provided SCS associated with a provided number of guard symbols based on the requested SCS, the SCS utilized on the backhaul link between the parent IAB node and the child IAB node, and other suitable factors. The SCS management circuitry 1544 may further be configured to operate together with the communication and processing circuitry 1542 to include the provided SCS in the MAC-CE including the guard symbols provided message for transmission to the child IAB node. The SCS management circuitry 1544 may further be configured to receive the provided SCS from an IAB donor node via an F1-AP message. The SCS management circuitry 1544 may further be configured to store the provided SCS 1516 within, for example, memory 1505.

In some examples, the requested and/or provided SCS 1516 may include a single SCS for all switch types. In other examples, the requested and/or provided SCS 1516 may include a respective SCS for each of the switch types.

In some examples, the SCS 1516 may be a default SCS configured or preconfigured on the child IAB node and the parent IAB node. For example, the default SCS includes the backhaul SCS of an active bandwidth part within which the parent IAB node and child IAB nodes are communicating over the backhaul link. In this example, the SCS management circuitry 1544 may retrieve the SCS 1516 stored within the memory 1505 to provide a gap (e.g., #GS 1515) at transitions of the child IAB node.

In some examples, the SCS management circuitry 1544 may further be configured to determine a reference SCS for use in identifying a child IAB node transition as an inter-slot transition or an intra-slot transition when different numbers of guard symbols are provided for inter-slot and intra-slot transitions. For example, the SCS management circuitry 1544 may utilize the slot boundaries associated with the reference SCS to define inter-/intra-slot transitions. In some examples, the child IAB node may not provide a requested SCS with the guard symbols desired message. In this example, the SCS management circuitry 1544 on the parent IAB node and the child IAB node may utilize the provided SCS included with the guard symbols provided message as the reference SCS. In some examples, the provided SCS may include the SCS utilized for communication on the backhaul link between the parent IAB node and the child IAB node.

In some examples, the child IAB node may include a requested SCS with the guard symbols desired message. In some examples, the requested SCS may include the SCS utilized for communication on respective second (child) links between the child IAB node and child nodes of the child IAB node. In this example, the SCS management circuitry 1544 on the parent IAB node and the child IAB node may select the reference SCS based on a preconfigured rule implemented on both the child IAB node and the parent IAB node. For example, the SCS management circuitry 1544 may select as the reference SCS the maximum SCS between the requested SCS and the provided SCS, the minimum SCS between the requested SCS and the provided SCS, the first SCS, or the second SCS (if included as the requested SCS in the guard symbols desired message). The SCS management circuitry 1544 may further be configured to execute SCS management software 1554 included on the computer-readable medium 1506 to implement one or more functions described herein.

Figure 16:
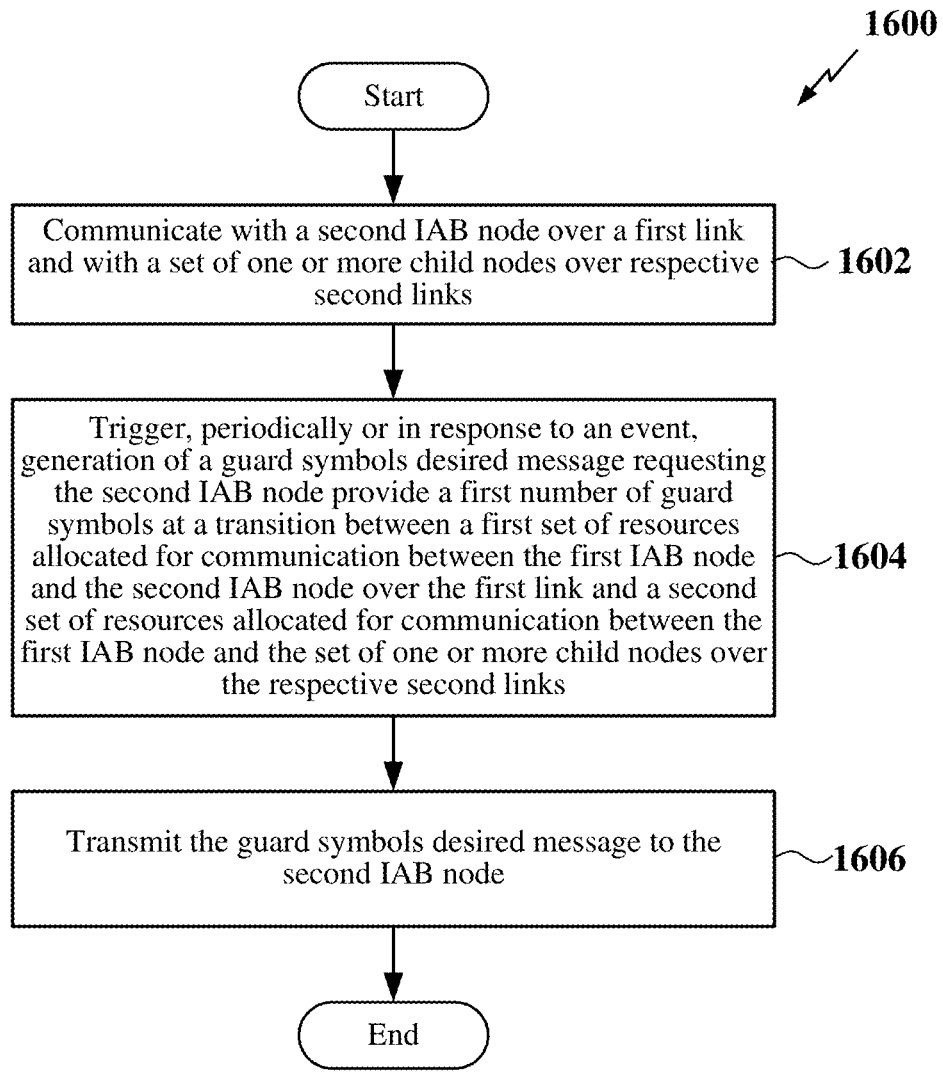
FIG. 16 is a flow chart illustrating an exemplary process for enhancing the provision of gaps at transitions in an IAB network according to some aspects.

FIG. 16 is a flow chart illustrating an exemplary process 1600 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 1600 may be carried out by the IAB node illustrated in FIG. 15. In some examples, the process 1600 may be carried out by any suitable apparatus or means for carrying out the functions or algorithm described below.

At block 1602, the IAB node (e.g., a first IAB node) may communicate with a second IAB node over a first link (e.g., a backhaul link) and with a set of one or more child nodes over respective second links (e.g., access or backhaul links). In some examples, the first IAB node is a child IAB node and the second IAB node is a parent IAB node of the child IAB node. For example, the communication and processing circuitry 1542, together with the transceiver 1510, shown and described above in connection with FIG. 15 may provide a means to communicate with the second IAB node and the set of one or more child nodes.

At block 1604, the first IAB node may trigger, periodically or in response to an event, generation of a guard symbols desired message requesting the second IAB node provide a first number of guard symbols at a transition between a first set of resources allocated for communication between the first IAB node and the second IAB node over the first link and a second set of resources allocated for communication between the first IAB node and the set of one or more child nodes over the respective second links. In some examples, the first IAB node may trigger the generation of the guard symbols desired message upon integration of the first IAB node in the IAB network. In some examples, the first IAB node may trigger the generation of the guard symbols desired message based on a change in the RTT and/or pathloss. For example, the gap management circuitry 1543 shown and described above in connection with FIG. 15 may provide a means to trigger the generation of the guard symbols desired message.

At block 1606, the first IAB node may transmit the guard symbols desired message to the second IAB node. For example, the communication and processing circuitry 1542, together with the transceiver 1510, shown and described above in connection with FIG. 15 may provide a means to transmit the guard symbols desired message to the second IAB node.

Figure 17:
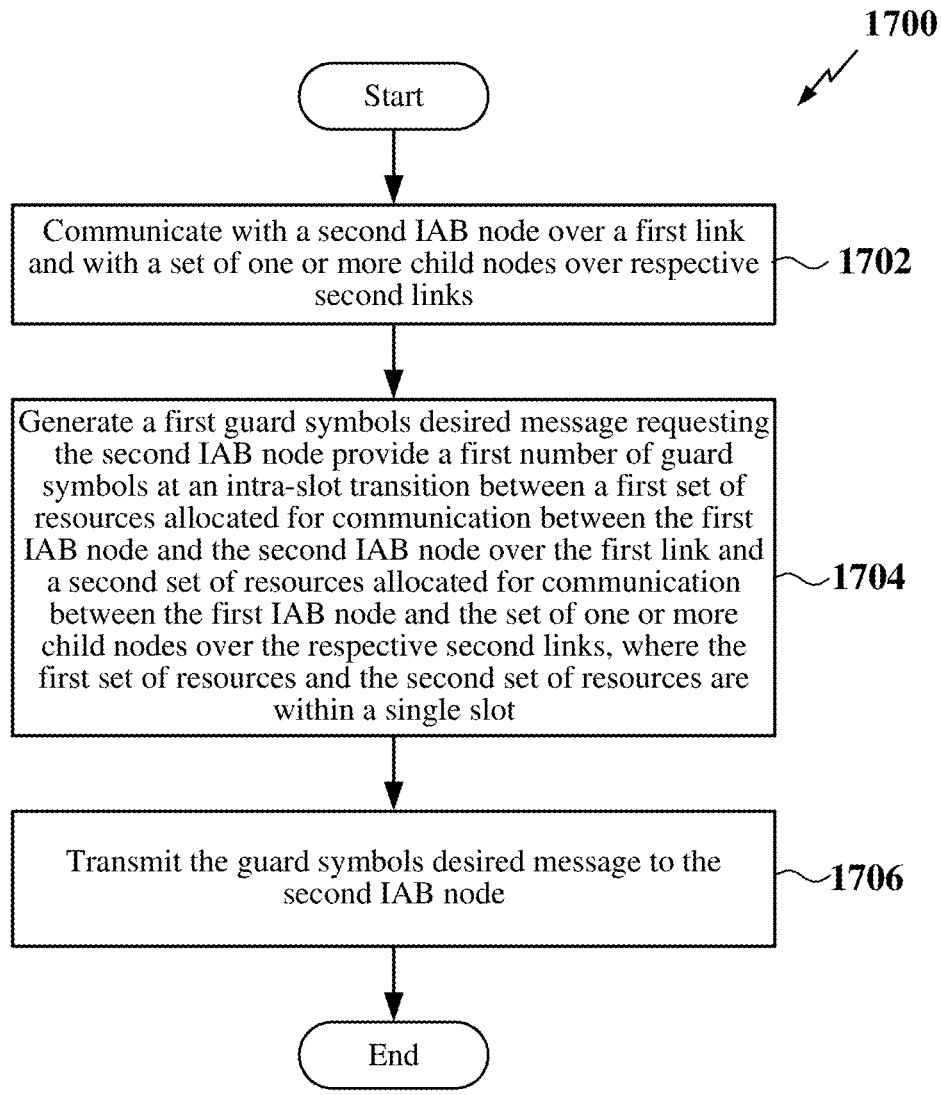
FIG. 17 is a flow chart illustrating another exemplary process for enhancing the provision of gaps at transitions in an IAB network according to some aspects.

FIG. 17 is a flow chart illustrating another exemplary process 1700 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 1700 may be carried out by the IAB node illustrated in FIG. 15. In some examples, the process 1700 may be carried out by any suitable apparatus or means for carrying out the functions or algorithm described below.

At block 1702, the IAB node (e.g., a first IAB node) may communicate with a second IAB node over a first link (e.g., a backhaul link) and with a set of one or more child nodes over respective second links (e.g., access or backhaul links). In some examples, the first IAB node is a child IAB node and the second IAB node is a parent IAB node of the child IAB node. For example, the communication and processing circuitry 1542, together with the transceiver 1510, shown and described above in connection with FIG. 15 may provide a means to communicate with the second IAB node and the set of one or more child nodes.

At block 1704, the first IAB node may generate a first guard symbols desired message requesting the second IAB node provide a first number of guard symbols at an intra-slot transition between a first set of resources allocated for communication between the first IAB node and the second IAB node over the first link and a second set of resources allocated for communication between the first IAB node and the set of one or more child nodes over the respective second links. Here, the first set of resources and the second set of resources are both included within a single slot.

In some examples, the first guard symbols desired message may further request the first number of guard symbols be provided at an inter-slot transition between a first slot allocated for communication between the first IAB node and the second IAB node over the first link and a second slot allocated for communication between the first IAB node and the set of one or more child nodes over the respective second links. Here, the first slot and the second slot are consecutive. In some examples, the first IAB node may further generate a second guard symbols desired message requesting the second IAB node provide a second number of guard symbols at an inter-slot transition between a first slot allocated for communication between the first IAB node and the second IAB node over the first link and a second slot allocated for communication between the first IAB node and the set of one or more child nodes over the respective second links.

In some examples, the first IAB node may further identify a transition between the first IAB node communicating on the first link and the first IAB node communicating on the second link as one of the intra-slot transition or the inter-slot transition using a reference subcarrier spacing. Here, the reference subcarrier spacing includes one of a first subcarrier spacing utilized for communication with the second IAB node on the first link or a second subcarrier spacing utilized for communication with the set of one or more child nodes on the respective second link. In some examples, when the first IAB node includes a requested SCS (e.g., the second SCS) with the guard symbols desired message, the reference SCS may include a maximum SCS between the first SCS and the second SCS, a minimum SCS between the first SCS and the second SCS, the first SCS, or the second SCS. For example, the gap management circuitry 1543, together with the communication and processing circuitry 1542, shown and described above in connection with FIG. 15 may provide a means to generate the first guard symbols desired message for intra-slot transitions.

At block 1706, the first IAB node may transmit the guard symbols desired message to the second IAB node. For example, the communication and processing circuitry 1542, together with the transceiver 1510, shown and described above in connection with FIG. 15 may provide a means to transmit the guard symbols desired message to the second IAB node.

Figure 18:
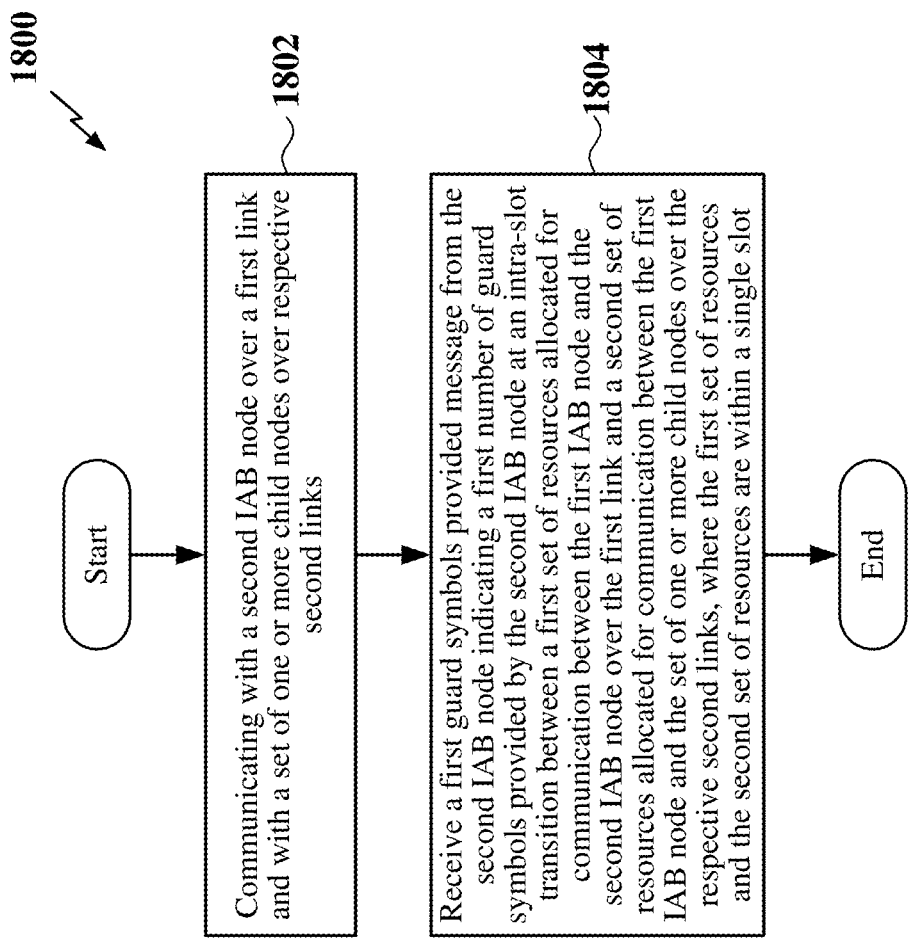
FIG. 18 is a flow chart illustrating another exemplary process for enhancing the provision of gaps at transitions in an IAB network according to some aspects.

FIG. 18 is a flow chart illustrating another exemplary process 1800 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 1800 may be carried out by the IAB node illustrated in FIG. 15. In some examples, the process 1800 may be carried out by any suitable apparatus or means for carrying out the functions or algorithm described below.

At block 1802, the IAB node (e.g., a first IAB node) may communicate with a second IAB node over a first link (e.g., a backhaul link) and with a set of one or more child nodes over respective second links (e.g., access or backhaul links). In some examples, the first IAB node is a child IAB node and the second IAB node is a parent IAB node of the child IAB node. For example, the communication and processing circuitry 1542, together with the transceiver 1510, shown and described above in connection with FIG. 15 may provide a means to communicate with the second IAB node and the set of one or more child nodes.

At block 1804, the first IAB node may receive a first guard symbols provided message indicating a first number of guard symbols provided by the second IAB node at an intra-slot transition between a first set of resources allocated for communication between the first IAB node and the second IAB node over the first link and a second set of resources allocated for communication between the first IAB node and the set of one or more child nodes over the respective second links. Here, the first set of resources and the second set of resources are both included within a single slot.

In some examples, the first guard symbols provided message may further indicate that the second IAB node further provides the first number of guard symbols at an inter-slot transition between a first slot allocated for communication between the first IAB node and the second IAB node over the first link and a second slot allocated for communication between the first IAB node and the set of one or more child nodes over the respective second links. Here, the first slot and the second slot are consecutive. In some examples, the first IAB node may further receive a second guard symbols provided message indicating a second number of guard symbols provided by the second IAB node at an inter-slot transition between a first slot allocated for communication between the first IAB node and the second IAB node over the first link and a second slot allocated for communication between the first IAB node and the set of one or more child nodes over the respective second links.

In some examples, the first IAB node may further identify a transition between the first IAB node communicating on the first link and the first IAB node communicating on the second link as one of the intra-slot transition or the inter-slot transition using a reference subcarrier spacing. Here, the reference subcarrier spacing includes one of a first subcarrier spacing utilized for communication with the second IAB node on the first link or a second subcarrier spacing utilized for communication with the set of one or more child nodes on the respective second links. In some examples, the reference SCS may be received with at least one of the first guard symbols provided message or the second guard symbols provided message. For example, the gap management circuitry 1543, together with the communication and processing circuitry 1542 and transceiver 1510, shown and described above in connection with FIG. 15 may provide a means to receive the first guard symbols provided message for intra-slot transitions.

Figure 19:
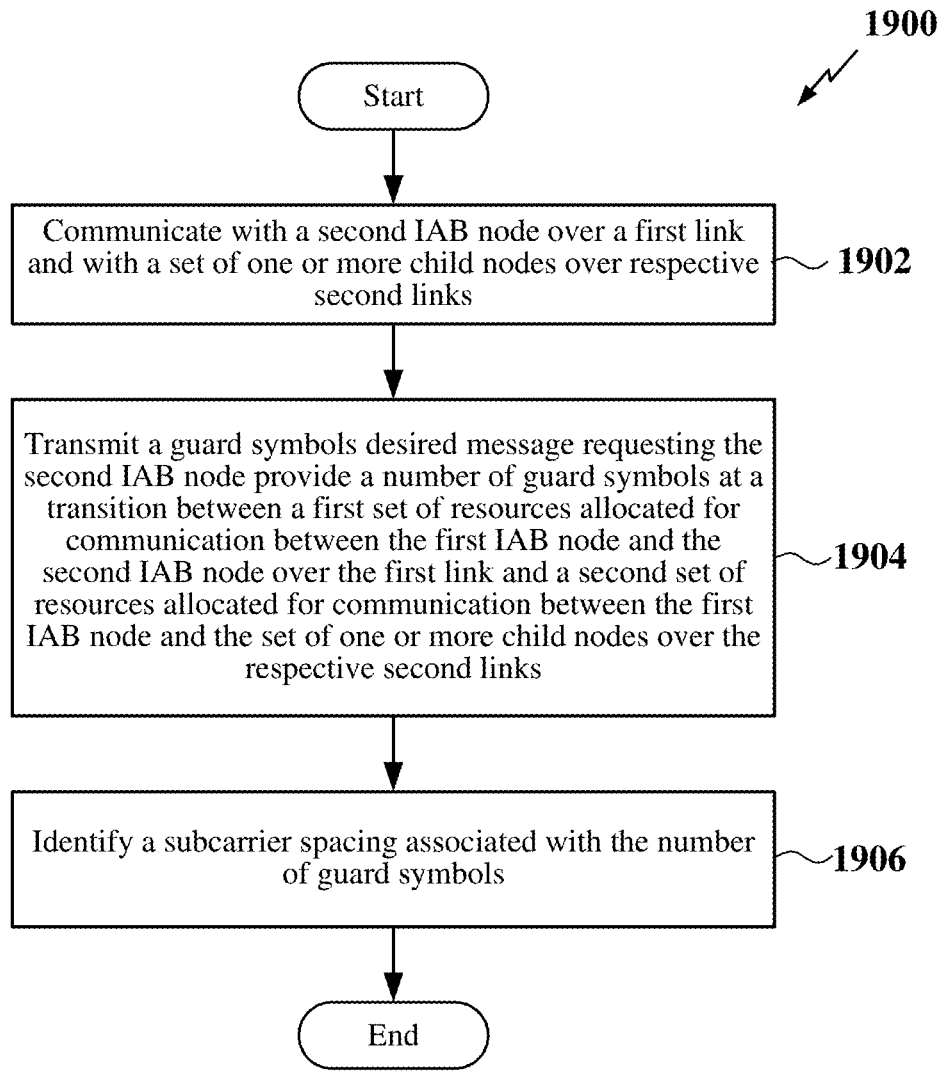
FIG. 19 is a flow chart illustrating another exemplary process for enhancing the provision of gaps at transitions in an IAB network according to some aspects.

FIG. 19 is a flow chart illustrating another exemplary process 1900 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 1900 may be carried out by the IAB node illustrated in FIG. 15. In some examples, the process 1900 may provide a means to be carried out by any suitable apparatus or means for carrying out the functions or algorithm described below.

At block 1902, the IAB node (e.g., a first IAB node) may communicate with a second IAB node over a first link (e.g., a backhaul link) and with a set of one or more child nodes over respective second links (e.g., access or backhaul links). In some examples, the first IAB node is a child IAB node and the second IAB node is a parent IAB node of the child IAB node. For example, the communication and processing circuitry 1542, together with the transceiver 1510, shown and described above in connection with FIG. 15 may provide a means to communicate with the second IAB node and the set of one or more child nodes.

At block 1904, the first IAB node may transmit a guard symbols desired message requesting the second IAB node provide a number of guard symbols at a transition between a first set of resources allocated for communication between the first IAB node and the second IAB node over the first link and a second set of resources allocated for communication between the first IAB node and the set of one or more child nodes over the respective second links. For example, the gap management circuitry 1543, together with the communication and processing circuitry 1542 and transceiver 1510, shown and described above in connection with FIG. 15 may provide a means to transmit the guard symbols desired message.

At block 1906, the first IAB node may identify a subcarrier spacing (SCS) associated with the number of guard symbols. In some examples, the first IAB node may identify the SCS by receiving an indication of the SCS via a MAC-CE from the second IAB node. In some examples, the first IAB node may identify the SCS by receiving the indication of the SCS via an RRC message from an IAB donor node. In some examples, the first IAB node may determine that the SCS is a default SCS. In some examples, the SCS includes a single SCS for each switch type. In other examples, the SCS includes a respective SCS for each of the switch types. For example, the SCS management circuitry 1544 shown and described above in connection with FIG. 15 may provide a means to identify the SCS associated with the number of guard symbols.

Figure 20:
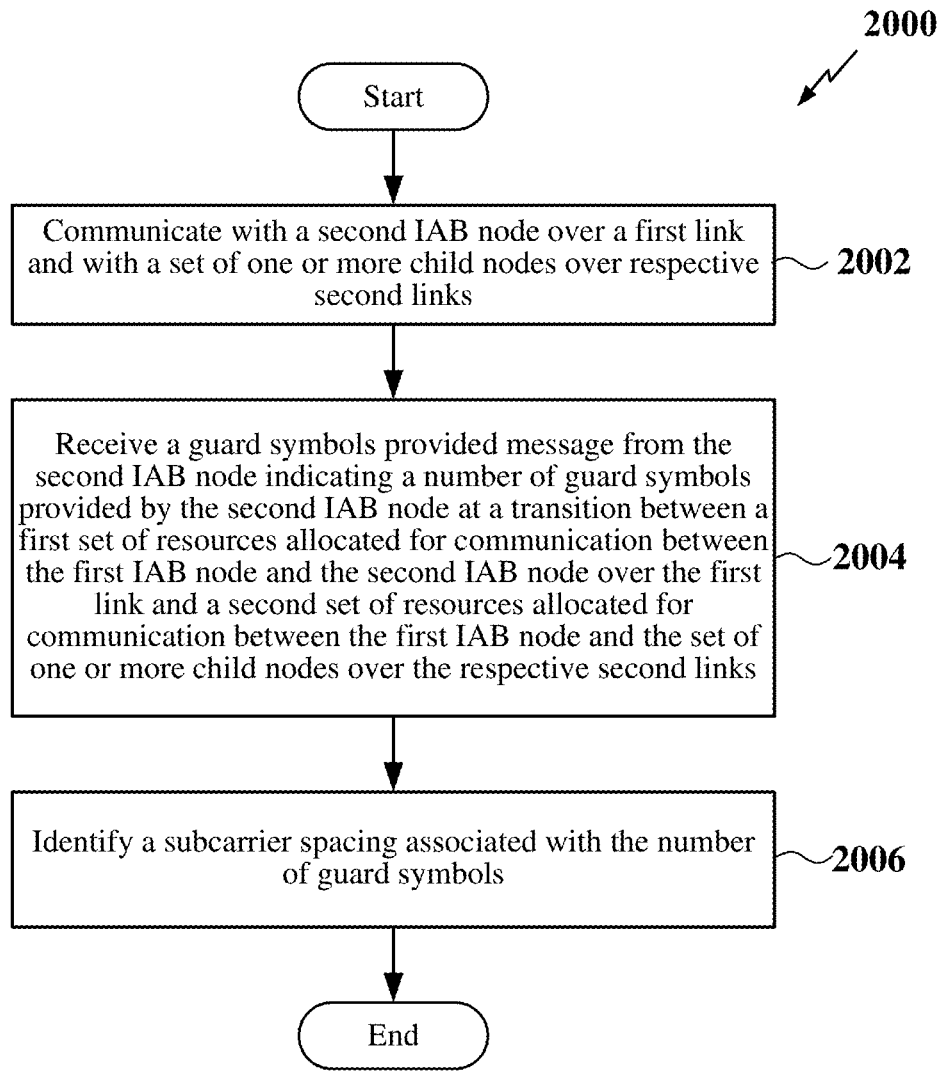
FIG. 20 is a flow chart illustrating another exemplary process for enhancing the provision of gaps at transitions in an IAB network according to some aspects.

FIG. 20 is a flow chart illustrating another exemplary process 2000 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 2000 may be carried out by the IAB node illustrated in FIG. 15. In some examples, the process 2000 may be carried out by any suitable apparatus or means for carrying out the functions or algorithm described below.

At block 2002, the IAB node (e.g., a first IAB node) may communicate with a second IAB node over a first link (e.g., a backhaul link) and with a set of one or more child nodes over respective second links (e.g., access or backhaul links). In some examples, the first IAB node is a child IAB node and the second IAB node is a parent IAB node of the child IAB node. For example, the communication and processing circuitry 1542, together with the transceiver 1510, shown and described above in connection with FIG. 15 may provide a means to communicate with the second IAB node and the set of one or more child nodes.

At block 2004, the first IAB node may receive a guard symbols provided message indicating a number of guard symbols provided by the second IAB node at a transition between a first set of resources allocated for communication between the first IAB node and the second IAB node over the first link and a second set of resources allocated for communication between the first IAB node and the set of one or more child nodes over the respective second links. For example, the gap management circuitry 1543, together with the communication and processing circuitry 1542 and transceiver 1510, shown and described above in connection with FIG. 15 may provide a means to receive the guard symbols provided message.

At block 2006, the first IAB node may identify a subcarrier spacing (SCS) associated with the number of guard symbols. In some examples, the first IAB node may identify the SCS by receiving an indication of the SCS via a MAC-CE from the second IAB node. For example, the MAC-CE may include the guard symbols provided message. In some examples, the first IAB node may identify the SCS by receiving the indication of the SCS via an RRC message from an IAB donor node. In some examples, the first IAB node may determine that the SCS is a default SCS. In some examples, the SCS includes a single SCS for each switch type. In other examples, the SCS includes a respective SCS for each of the switch types. For example, the SCS management circuitry 1544 shown and described above in connection with FIG. 15 may provide a means to identify the SCS associated with the number of guard symbols.

Figure 21:
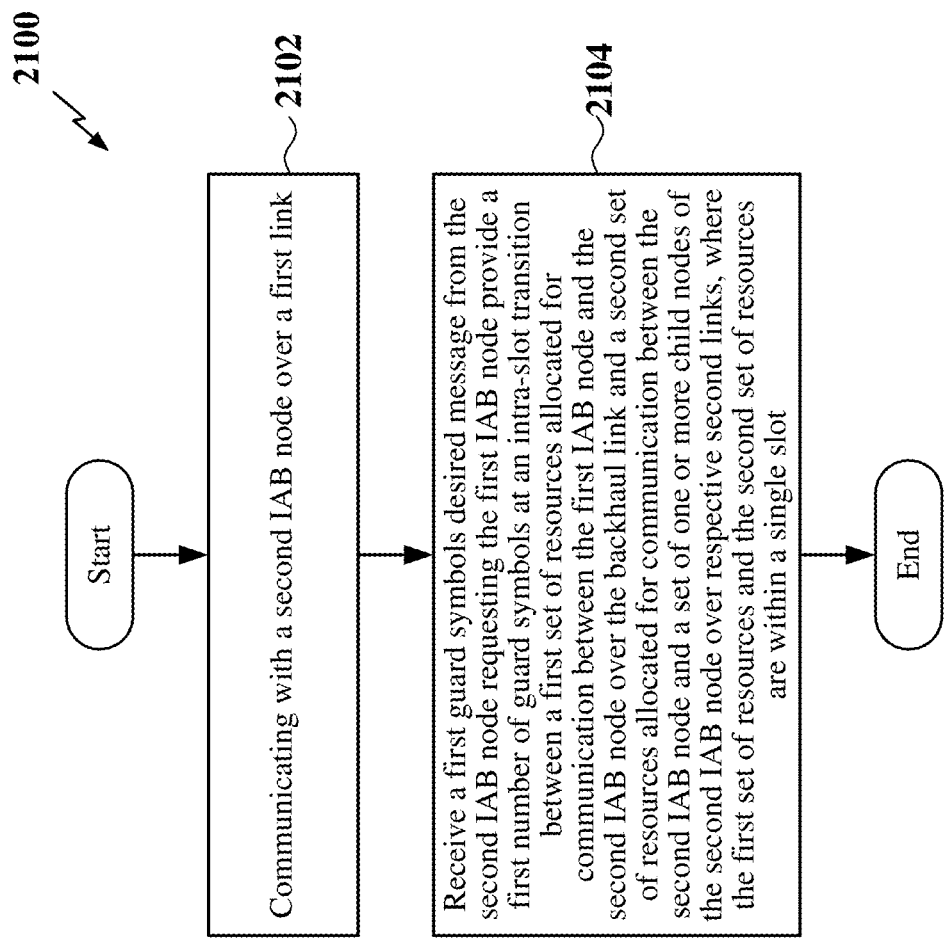
FIG. 21 is a flow chart illustrating another exemplary process for enhancing the provision of gaps at transitions in an IAB network according to some aspects.

FIG. 21 is a flow chart illustrating another exemplary process 2100 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 2100 may be carried out by the IAB node illustrated in FIG. 15. In some examples, the process 2100 may be carried out by any suitable apparatus or means for carrying out the functions or algorithm described below.

At block 2102, the IAB node (e.g., a first IAB node) may communicate with a second IAB node over a first link (e.g., a backhaul link). In some examples, the first IAB node is a parent IAB node and the second IAB node is a child IAB node of the parent IAB node. For example, the communication and processing circuitry 1542, together with the transceiver 1510, shown and described above in connection with FIG. 15 may provide a means to communicate with the second IAB node.

At block 2104, the first IAB node may receive a first guard symbols desired message from the second IAB node requesting the first IAB node provide a first number of guard symbols at an intra-slot transition between a first set of resources allocated for communication between the first IAB node and the second IAB node over the first link and a second set of resources allocated for communication between the second IAB node and a set of one or more child nodes of the second IAB node over respective second links. Here, the first set of resources and the second set of resources are both included within a single slot.

In some examples, the first guard symbols desired message may further request the first number of guard symbols be provided at an inter-slot transition between a first slot allocated for communication between the first IAB node and the second IAB node over the first link and a second slot allocated for communication between the second IAB node and the set of one or more child nodes over the respective second links. Here, the first slot and the second slot are consecutive. In some examples, the first IAB node may further receive a second guard symbols desired message from the second IAB node requesting the first IAB node provide a second number of guard symbols at an inter-slot transition between a first slot allocated for communication between the first IAB node and the second IAB node over the first link and a second slot allocated for communication between the second IAB node and the set of one or more child nodes over the respective second links.

In some examples, the first IAB node may further identify a transition between the second IAB node communicating on the first link and the second IAB node communicating on the second link as one of the intra-slot transition or the inter-slot transition using a reference subcarrier spacing. Here, the reference subcarrier spacing includes one of a first subcarrier spacing utilized for communication between the first IAB node and the second IAB node on the first link or a second subcarrier spacing utilized by the second IAB node for communication with the set of one or more child nodes on the respective second link. In some examples, when the guard symbols desired message includes a requested SCS (e.g., the second SCS), the reference SCS may include a maximum SCS between the first SCS and the second SCS, a minimum SCS between the first SCS and the second SCS, the first SCS, or the second SCS. For example, the gap management circuitry 1543, together with the communication and processing circuitry 1542 and transceiver 1510, shown and described above in connection with FIG. 15 may provide a means to receive the first guard symbols desired message for intra-slot transitions.

Figure 22:
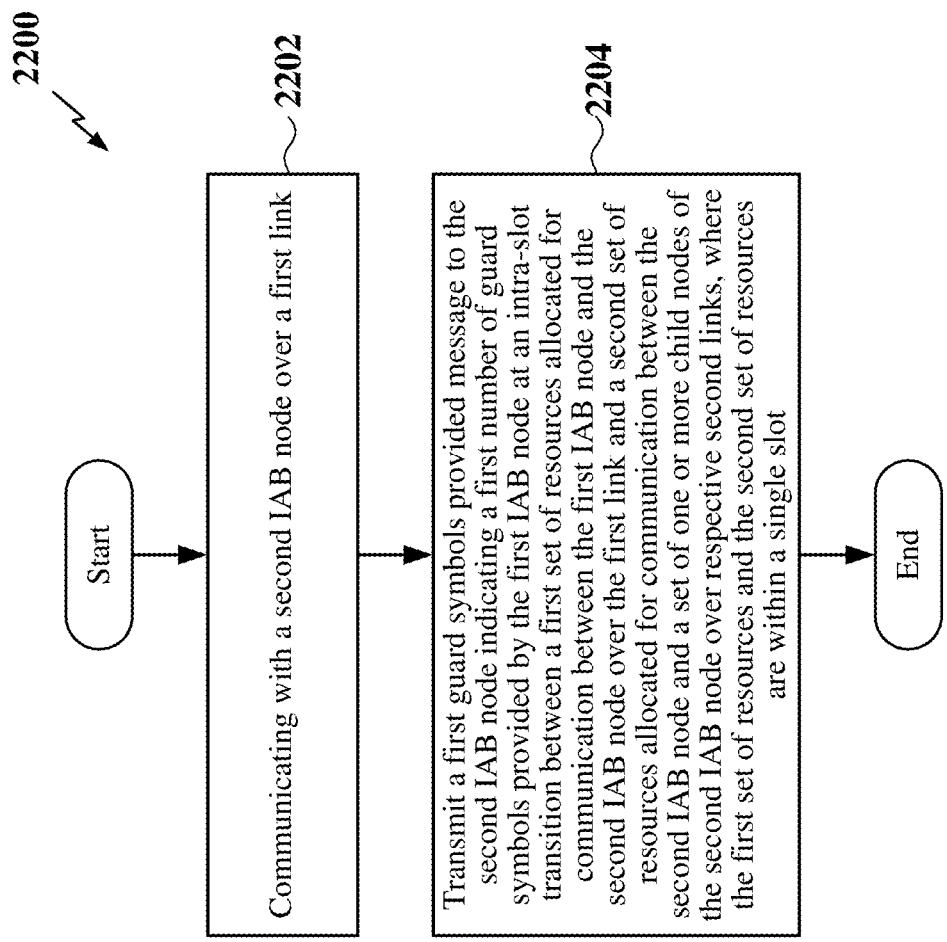
FIG. 22 is a flow chart illustrating another exemplary process for enhancing the provision of gaps at transitions in an IAB network according to some aspects.

FIG. 22 is a flow chart illustrating another exemplary process 2200 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 2200 may be carried out by the IAB node illustrated in FIG. 15. In some examples, the process 2200 may be carried out by any suitable apparatus or means for carrying out the functions or algorithm described below.

At block 2202, the IAB node (e.g., a first IAB node) may communicate with a second IAB node over a first link (e.g., a backhaul link). In some examples, the first IAB node is a parent IAB node and the second IAB node is a child IAB node of the parent IAB node. For example, the communication and processing circuitry 1542, together with the transceiver 1510, shown and described above in connection with FIG. 15 may provide a means to communicate with the second IAB node.

At block 2204, the first IAB node may transmit a first guard symbols provided message to the second IAB node indicating a first number of guard symbols provided by the first IAB node at an intra-slot transition between a first set of resources allocated for communication between the first IAB node and the second IAB node over the first link and a second set of resources allocated for communication between the second IAB node and a set of one or more child nodes of the second IAB node over respective second links. Here, the first set of resources and the second set of resources are both included within a single slot.

In some examples, the first guard symbols provided message may further indicate that the first IAB node further provides the first number of guard symbols at an inter-slot transition between a first slot allocated for communication between the first IAB node and the second IAB node over the first link and a second slot allocated for communication between the second IAB node and the set of one or more child nodes over the respective second links. Here, the first slot and the second slot are consecutive. In some examples, the first IAB node may further transmit a second guard symbols provided message indicating a second number of guard symbols provided by the first IAB node at an inter-slot transition between a first slot allocated for communication between the first IAB node and the second IAB node over the first link and a second slot allocated for communication between the second IAB node and the set of one or more child nodes over the respective second links.

In some examples, the first IAB node may further identify a transition between the second IAB node communicating on the first link and the second IAB node communicating on the second link as one of the intra-slot transition or the inter-slot transition using a reference subcarrier spacing. Here, the reference subcarrier spacing includes one of a first subcarrier spacing utilized for communication between the first IAB node and the second IAB node on the first link or a second subcarrier spacing utilized by the second IAB node for communication with the set of one or more child nodes on the respective second links. In some examples, the reference SCS may be transmitted with at least one of the first guard symbols provided message or the second guard symbols provided message. For example, the gap management circuitry 1543, together with the communication and processing circuitry 1542 and transceiver 1510, shown and described above in connection with FIG. 15 may provide a means to transmit the first guard symbols provided message for intra-slot transitions.

Figure 23:
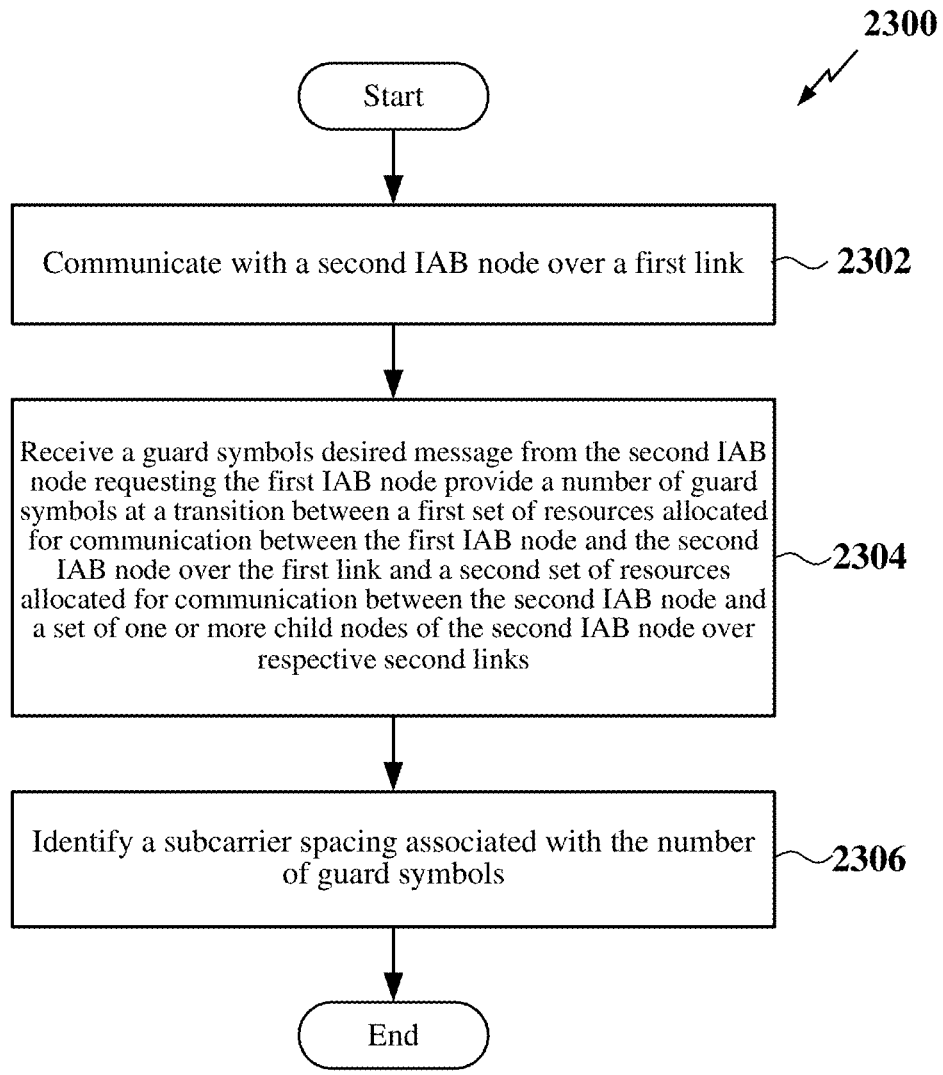
FIG. 23 is a flow chart illustrating another exemplary process for enhancing the provision of gaps at transitions in an IAB network according to some aspects.

FIG. 23 is a flow chart illustrating another exemplary process 2300 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 2300 may be carried out by the IAB node illustrated in FIG. 15. In some examples, the process 2300 may be carried out by any suitable apparatus or means for carrying out the functions or algorithm described below.

At block 2302, the IAB node (e.g., a first IAB node) may communicate with a second IAB node over a first link (e.g., a backhaul link). In some examples, the first IAB node is a parent IAB node and the second IAB node is a child IAB node of the parent IAB node. For example, the communication and processing circuitry 1542, together with the transceiver 1510, shown and described above in connection with FIG. 15 may provide a means to communicate with the second IAB node.

At block 2304, the first IAB node may receive a guard symbols desired message from the second IAB node requesting the first IAB node provide a number of guard symbols at a transition between a first set of resources allocated for communication between the first IAB node and the second IAB node over the first link and a second set of resources allocated for communication between the second IAB node and a set of one or more child nodes of the second IAB node over respective second links. For example, the gap management circuitry 1543, together with the communication and processing circuitry 1542 and transceiver 1510, shown and described above in connection with FIG. 15 may provide a means to receive the guard symbols desired message.

At block 2306, the first IAB node may identify a subcarrier spacing (SCS) associated with the number of guard symbols. In some examples, the first IAB node may identify the SCS by receiving an indication of the SCS via a MAC-CE from the second IAB node. For example, the MAC-CE may further include the guard symbols desired message. In some examples, the first IAB node may identify the SCS by receiving the indication of the SCS via an F1-AP message from an IAB donor node. In some examples, the first IAB node may determine that the SCS is a default SCS. In some examples, the SCS includes a single SCS for each switch type. In other examples, the SCS includes a respective SCS for each of the switch types. For example, the SCS management circuitry 1544 shown and described above in connection with FIG. 15 may provide a means to identify the SCS associated with the number of guard symbols.

Figure 24:
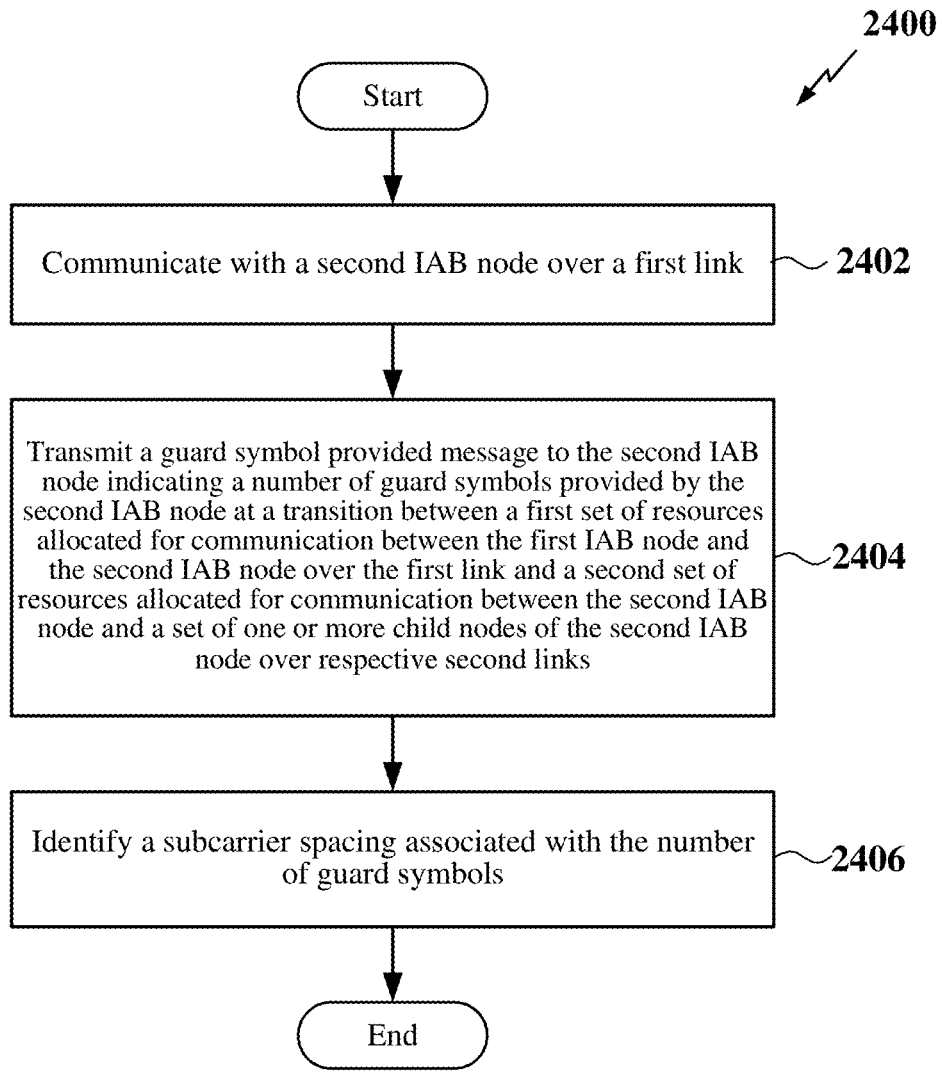
FIG. 24 is a flow chart illustrating another exemplary process for enhancing the provision of gaps at transitions in an IAB network according to some aspects.

FIG. 24 is a flow chart illustrating another exemplary process 2400 for enhancing the provision of gaps at transitions in an IAB network according to some aspects. As described below, some or all illustrated features may be omitted in a particular implementation within the scope of the present disclosure, and some illustrated features may not be required for implementation of all examples. In some examples, the process 2400 may be carried out by the IAB node illustrated in FIG. 15. In some examples, the process 2400 may be carried out by any suitable apparatus or means for carrying out the functions or algorithm described below.

At block 2402, the IAB node (e.g., a first IAB node) may communicate with a second IAB node over a first link (e.g., a backhaul link). In some examples, the first IAB node is a parent IAB node and the second IAB node is a child IAB node of the parent IAB node. For example, the communication and processing circuitry 1542, together with the transceiver 1510, shown and described above in connection with FIG. 15 may provide a means to communicate with the second IAB node.

At block 2404, the first IAB node may transmit a guard symbols provided message to the second IAB node indicating a number of guard symbols provided by the first IAB node at a transition between a first set of resources allocated for communication between the first IAB node and the second IAB node over the first link and a second set of resources allocated for communication between the second IAB node and a set of one or more child nodes of the second IAB node over respective second links. For example, the gap management circuitry 1543, together with the communication and processing circuitry 1542 and transceiver 1510, shown and described above in connection with FIG. 15 may provide a means to transmit the guard symbols provided message.

At block 2406, the first IAB node may identify a subcarrier spacing (SCS) associated with the number of guard symbols. In some examples, the first IAB node may identify the SCS by receiving an indication of the SCS via a MAC-CE from the second IAB node. In some examples, the first IAB node may identify the SCS by receiving the indication of the SCS via an F1-AP message from an IAB donor node. In some examples, the first IAB node may determine that the SCS is a default SCS. In some examples, the SCS includes a single SCS for each switch type. In other examples, the SCS includes a respective SCS for each of the switch types. For example, the SCS management circuitry 1544 shown and described above in connection with FIG. 15 may provide a means to identify the SCS associated with the number of guard symbols.

In one configuration, the IAB node includes various means as described in the present disclosure. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one of the FIGS. 1, 2, 4-7, and/or 10-14, and utilizing, for example, the processes and/or algorithms described herein in relation to FIGS. 16-24.

The following provides an overview of examples of the present disclosure.

Example 1: A method of wireless communication at a first integrated access backhaul (IAB) node within an IAB network, comprising: communicating with a second IAB node over a first link and with a set of one or more child nodes over respective second links; transmitting a guard symbols desired message requesting the second IAB node provide a number of guard symbols at a transition between a first set of resources allocated for communication between the first IAB node and the second IAB node over the first link and a second set of resources allocated for communication between the first IAB node and the set of one or more child nodes over the respective second links; and identifying a subcarrier spacing associated with the number of guard symbols.

Example 2: The method of example 1, wherein the identifying the subcarrier spacing comprises: receiving an indication of the subcarrier spacing via a first medium access control-control element (MAC-CE) from the second IAB node; receiving the indication of the subcarrier spacing via a first radio resource control (RRC) message from an IAB donor node; or determining the subcarrier spacing comprises a default subcarrier spacing.

Example 3: The method of example 2, wherein the default subcarrier spacing comprises a backhaul subcarrier spacing of an active bandwidth part within which the first IAB node and the second IAB node are communicating via the first link.

Example 4: The method of any of examples 1 through 3, further comprising: transmitting an indication of the subcarrier spacing via a second MAC-CE to the second IAB node.

Example 5: The method of example 4, wherein the second MAC-CE comprises the indication of the subcarrier spacing and the guard symbols desired message.

Example 6: The method of any of examples 1 through 5, wherein: the number of guard symbols comprises a respective number of guard symbols for each of a plurality of switch types; and each of the plurality of switch types comprise a respective switch between the first IAB node transmitting or receiving on the first link and the first IAB node transmitting or receiving on the respective second links.

Example 7: The method of example 6, wherein the subcarrier spacing applies to each of the plurality of switch types.

Example 8: The method of example 6, wherein the subcarrier spacing comprises a respective dedicated subcarrier spacing for each of the plurality of switch types.

Example 9: A method of wireless communication at a first integrated access backhaul (IAB) node within an IAB network, comprising: communicating with a second IAB node over a first link and with a set of one or more child nodes over respective second links; receiving a guard symbols provided message from the second IAB node indicating a number of guard symbols provided by the second IAB node at a transition between a first set of resources allocated for communication between the first IAB node and the second IAB node over the first link and a second set of resources allocated for communication between the first IAB node and the set of one or more child nodes over the respective second links; and identifying a subcarrier spacing associated with the number of guard symbols.

Example 10: The method of example 9, wherein the identifying the subcarrier spacing comprises: receiving an indication of the subcarrier spacing via a medium access control-control element (MAC-CE) from the second IAB node; receiving the indication of the subcarrier spacing via a radio resource control (RRC) message from an IAB donor node; or determining the subcarrier spacing comprises a default subcarrier spacing.

Example 11: The method of example 10, wherein the default subcarrier spacing comprises a backhaul subcarrier spacing of an active bandwidth part within which the first IAB node and the second IAB node are communicating via the first link.

Example 12: The method of example 10, wherein the MAC-CE comprises the indication of the subcarrier spacing and the guard symbols provided message.

Example 13: The method of any of examples 9 through 12, wherein: the number of guard symbols comprises a respective number of guard symbols for each of a plurality of switch types; and each of the plurality of switch types comprise a respective switch between the first IAB node transmitting or receiving on the first link and the first IAB node transmitting or receiving on the respective second links.

Example 14: The method of example 13, wherein the subcarrier spacing applies to each of the plurality of switch types.

Example 15: The method of example 13, wherein the subcarrier spacing comprises a respective dedicated subcarrier spacing for each of the plurality of switch types.

Example 16: A method of wireless communication at a first integrated access backhaul (IAB) node within an IAB network, comprising: communicating with a second IAB node over a first link; receiving a guard symbols desired message from the second IAB node requesting the first IAB node provide a number of guard symbols at a transition between a first set of resources allocated for communication between the first IAB node and the second IAB node over the first link and a second set of resources allocated for communication between the second IAB node and a set of one or more child nodes of the second IAB node over the respective second links; and identifying a subcarrier spacing associated with the number of guard symbols.

Example 17: The method of example 16, wherein the identifying the subcarrier spacing comprises: receiving an indication of the subcarrier spacing via a medium access control-control element (MAC-CE) from the second IAB node; receiving the indication of the subcarrier spacing via an F1-AP message from an IAB donor node; or determining the subcarrier spacing comprises a default subcarrier spacing.

Example 18: The method of example 17, wherein the MAC-CE comprises the indication of the subcarrier spacing and the guard symbols desired message.

Example 19: The method of example 17, wherein the default subcarrier spacing comprises a backhaul subcarrier spacing of an active bandwidth part within which the first IAB node and the second IAB node are communicating via the first link.

Example 20: The method of any of examples 16 through 19, wherein: the number of guard symbols comprises a respective number of guard symbols for each of a plurality of switch types; and each of the plurality of switch types comprise a respective switch between the second IAB node transmitting or receiving on the first link and the second IAB node transmitting or receiving on the respective second links.

Example 21: The method of example 20, wherein the subcarrier spacing applies to each of the plurality of switch types.

Example 22: The method of example 20, wherein the subcarrier spacing comprises a respective dedicated subcarrier spacing for each of the plurality of switch types.

Example 23: A method of wireless communication at a first integrated access backhaul (IAB) node within an IAB network, comprising: communicating with a second IAB node over a first link; transmitting a guard symbols provided message to the second IAB node indicating a number of guard symbols provided by the first IAB node at a transition between a first set of resources allocated for communication between the first IAB node and the second IAB node over the first link and a second set of resources allocated for communication between the second IAB node and a set of one or more child nodes of the second IAB node over respective second links; and identifying a subcarrier spacing associated with the number of guard symbols.

Example 24: The method of example 23, wherein the identifying the subcarrier spacing comprises: receiving an indication of the subcarrier spacing via a first medium access control-control element (MAC-CE) from the second IAB node; receiving the indication of the subcarrier spacing via an F1-AP message from an IAB donor node; or determining the subcarrier spacing comprises a default subcarrier spacing.

Example 25: The method of example 24, wherein the default subcarrier spacing comprises a backhaul subcarrier spacing of an active bandwidth part within which the first IAB node and the second IAB node are communicating via the first link.

Example 26: The method of any of examples 23 through 25, further comprising: transmitting an indication of the subcarrier spacing via a second MAC-CE to the second IAB node.

Example 27: The method of example 26, wherein the second MAC-CE comprises the indication of the subcarrier spacing and the guard symbols provided message.

Example 28: The method of any of examples 23 through 27, wherein: the number of guard symbols comprises a respective number of guard symbols for each of a plurality of switch types; and each of the plurality of switch types comprise a respective switch between the second IAB node transmitting or receiving on the first link and the second IAB node transmitting or receiving on the respective second links.

Example 29: The method of example 28, wherein the subcarrier spacing applies to each of the plurality of switch types.

Example 30: The method of example 28, wherein the subcarrier spacing comprises a respective dedicated subcarrier spacing for each of the plurality of switch types.

Example 31: A first integrated access backhaul (IAB) node within an IAB network comprising a wireless transceiver, a memory, and processor coupled to the wireless transceiver and the memory, the processor and memory configured to perform a method of any one of examples 1 through 30.

Example 32: A first integrated access backhaul (IAB) node within an IAB network comprising at least one means for performing a method of any one of examples 1 through 30.

Example 33: An article of manufacture for use by a first integrated access backhaul (IAB) node within an IAB network comprising a non-transitory computer-readable medium having stored therein instructions executable by one or more processors of the first IAB node to perform a method of any one of examples 1 through 30.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1,2,4-7, and 10-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A method of wireless communication at a first integrated access backhaul (IAB) node within an IAB network, comprising:
   communicating with a second IAB node over a first link and with a set of one or more child nodes over respective second links, the second IAB node being a parent IAB node of the first IAB node;
   transmitting a guard symbols desired message requesting the second IAB node provide a number of guard symbols at a transition between a first set of resources allocated for communication between the first IAB node and the second IAB node over the first link and a second set of resources allocated for communication between the first IAB node and the set of one or more child nodes over the respective second links; and
   identifying a subcarrier spacing associated with the number of guard symbols, the identifying the subcarrier spacing including
      receiving an indication of the subcarrier spacing via a first radio resource control (RRC) message from an IAB donor node.

2. The method of claim 1, wherein:
   the number of guard symbols comprises a respective number of guard symbols for each of a plurality of switch types; and
   each of the plurality of switch types comprises a respective switch between the first IAB node transmitting or receiving on the first link and the first IAB node transmitting or receiving on the respective second links.

3. The method of claim 2, wherein the subcarrier spacing applies to each of the plurality of switch types.

4. The method of claim 2, wherein the subcarrier spacing comprises a respective dedicated subcarrier spacing for each of the plurality of switch types.

5. A method of wireless communication at a first integrated access backhaul (IAB) node within an IAB network, comprising:
   communicating with a second IAB node over a first link and with a set of one or more child nodes over respective second links, the second IAB node being a parent IAB node of the first IAB node;
   receiving a guard symbols provided message from the second IAB node indicating a number of guard symbols provided by the second IAB node at a transition between a first set of resources allocated for communication between the first IAB node and the second IAB node over the first link and a second set of resources allocated for communication between the first IAB node and the set of one or more child nodes over the respective second links; and
   identifying a subcarrier spacing associated with the number of guard symbols, the identifying the subcarrier spacing including:
      receiving an indication of the subcarrier spacing via a first radio resource control (RRC) message from an IAB donor node.

6. The method of claim 5, wherein:
   the number of guard symbols comprises a respective number of guard symbols for each of a plurality of switch types; and
   each of the plurality of switch types comprises a respective switch between the first IAB node transmitting or receiving on the first link and the first IAB node transmitting or receiving on the respective second links.

7. The method of claim 6, wherein the subcarrier spacing applies to each of the plurality of switch types.

8. The method of claim 6, wherein the subcarrier spacing comprises a respective dedicated subcarrier spacing for each of the plurality of switch types.

9. A method of wireless communication at a first integrated access backhaul (IAB) node within an IAB network, comprising:
   communicating with a second IAB node over a first link utilizing a first subcarrier spacing;
   communicating with a set of one or more child nodes over respective second links utilizing a second subcarrier spacing, wherein the first subcarrier spacing is different than the second subcarrier spacing;
   generating a first guard symbols desired message requesting the second IAB node provide a first number of guard symbols at an intra-slot transition between a first set of resources allocated for communication between the first IAB node and the second IAB node over the first link and a second set of resources allocated for communication between the first IAB node and the set of one or more child nodes over the respective second links, wherein the first set of resources and the second set of resources are within a single slot;
   transmitting the first guard symbols desired message to the second IAB node; and
   identifying a transition between the first IAB node communicating on the first link and the first IAB node communicating on the respective second links as one of the intra-slot transition or an inter-slot transition using a reference subcarrier spacing, wherein the reference subcarrier spacing comprises one of the first subcarrier spacing or the second subcarrier spacing.

10. The method of claim 9, wherein the first guard symbols desired message further requests the first number of guard symbols be provided at the inter-slot transition between a first slot allocated for communication between the first IAB node and the second IAB node over the first link and a second slot allocated for communication between the first IAB node and the set of one or more child nodes over the respective second links, wherein the first slot and the second slot are consecutive.

11. The method of claim 9, further comprising:
   generating a second guard symbols desired message requesting the second IAB node provide a second number of guard symbols at the inter-slot transition between a first slot allocated for communication between the first IAB node and the second IAB node over the first link and a second slot allocated for communication between the first IAB node and the set of one or more child nodes over the respective second links; and
   transmitting the second guard symbols desired message to the second IAB node.

12. The method of claim 11, further comprising:
   transmitting the second subcarrier spacing with at least one of the first guard symbols desired message or the second guard symbols desired message.

13. The method of claim 12, wherein the reference subcarrier spacing comprises a maximum subcarrier spacing between the first subcarrier spacing and the second subcarrier spacing, a minimum subcarrier spacing between the first subcarrier spacing and the second subcarrier spacing, the first subcarrier spacing, or the second subcarrier spacing.

14. A method of wireless communication at a first integrated access backhaul (IAB) node within an IAB network, comprising:
   communicating with a second IAB node on a first link utilizing a first subcarrier spacing, wherein the second IAB node communicates with a set of one or more child nodes on respective second links utilizing a second subcarrier spacing, wherein the first subcarrier spacing is different than the second subcarrier spacing;
   identifying a transition between the second IAB node communicating on the first link and the second IAB node communicating on the respective second links as one of an intra-slot transition or an inter-slot transition using a reference subcarrier spacing, wherein the reference subcarrier spacing comprises one of the first subcarrier spacing and the second subcarrier spacing; and
   transmitting a first guard symbols provided message to the second IAB node indicating a first number of guard symbols provided by the first IAB node at the intra-slot transition between a first set of resources allocated for communication between the first IAB node and the second IAB node over the first link and a second set of resources allocated for communication between the second IAB node and the set of one or more child nodes of the second IAB node over the respective second links, wherein the first set of resources and the second set of resources are within a single slot.

15. The method of claim 14, wherein the first guard symbols provided message further indicates that the first IAB node further provides the first number of guard symbols at the inter-slot transition between a first slot allocated for communication between the first IAB node and the second IAB node over the first link and a second slot allocated for communication between the second IAB node and the set of one or more child nodes over the respective second links, wherein the first slot and the second slot are consecutive.

16. The method of claim 14, further comprising:
transmitting a second guard symbols provided message to the second IAB node indicating a second number of guard symbols provided by the first IAB node at the inter-slot transition between a first slot allocated for communication between the first IAB node and the second IAB node over the first link and a second slot allocated for communication between the second IAB node and the set of one or more child nodes over the respective second links.

17. The method of claim 16, further comprising:
transmitting the reference subcarrier spacing with at least one of the first guard symbols provided message or the second guard symbols provided message.

* * * * *